US011667247B2

(12) United States Patent
Kamiya et al.

(10) Patent No.: US 11,667,247 B2
(45) Date of Patent: Jun. 6, 2023

(54) ULTRASONIC SENSOR

(71) Applicant: DENSO CORPORATION, Kariya (JP)

(72) Inventors: Tatsuya Kamiya, Kariya (JP); Itaru Ishii, Kariya (JP); Tomoki Tanemura, Kariya (JP); Takashi Aoki, Kariya (JP); Tetsuya Katoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 312 days.

(21) Appl. No.: 16/922,030

(22) Filed: Jul. 7, 2020

(65) Prior Publication Data

US 2021/0009046 A1 Jan. 14, 2021

(30) Foreign Application Priority Data

Jul. 10, 2019 (JP) .............................. JP2019-128691

(51) Int. Cl.
*B60R 11/00* (2006.01)
*G01S 15/931* (2020.01)
*G01S 7/524* (2006.01)
*G01S 7/521* (2006.01)

(52) U.S. Cl.
CPC .............. *B60R 11/00* (2013.01); *G01S 7/521* (2013.01); *G01S 15/931* (2013.01); *B60R 2011/004* (2013.01); *G01S 2015/938* (2013.01)

(58) Field of Classification Search
CPC combination set(s) only.
See application file for complete search history.

(56) References Cited

U.S. PATENT DOCUMENTS

| 8,077,900 B2 * | 12/2011 | Minamio ............... H04R 31/00 |
| | | 257/419 |
| 2006/0043843 A1 * | 3/2006 | Sugiura ................... G01S 7/521 |
| | | 310/348 |
| 2006/0167595 A1 * | 7/2006 | Breed ................. B60R 21/0152 |
| | | 701/1 |
| 2007/0040477 A1 | 2/2007 | Sugiura et al. |

(Continued)

FOREIGN PATENT DOCUMENTS

| DE | 101 06 142 A1 | 8/2002 | |
| JP | 59218098 A * | 12/1984 | ............. H04R 17/02 |

(Continued)

OTHER PUBLICATIONS

JP-59218098-A translation (Year: 1984).*

(Continued)

*Primary Examiner* — Daniel L Murphy
*Assistant Examiner* — Amie M Ndure
(74) *Attorney, Agent, or Firm* — Posz Law Group, PLC

(57) ABSTRACT

An ultrasonic sensor includes: an ultrasonic element provided to transmit or receive an ultrasonic wave propagating along a directional axis; and an element housing case that includes a case diaphragm having a thickness direction along the directional axis. A resonant space is defined between the case diaphragm and the ultrasonic element for the propagating wave, by housing the ultrasonic element while separating the ultrasonic element from the case diaphragm. A horn shape is defined in the element housing case in which a width of the resonant space in a direction orthogonal to the directional axis is reduced as the resonant space extends in an axial direction parallel to the directional axis.

20 Claims, 11 Drawing Sheets

(56) References Cited

U.S. PATENT DOCUMENTS

| | | | |
|---|---|---|---|
| 2007/0144261 A1* | 6/2007 | Okuda | G01N 29/223 73/627 |
| 2008/0116765 A1 | 5/2008 | Sugiura et al. | |
| 2009/0238394 A1* | 9/2009 | Minamio | H04R 31/00 381/361 |
| 2011/0235841 A1 | 9/2011 | Tanaka et al. | |
| 2011/0293128 A1 | 12/2011 | Kuratani et al. | |
| 2017/0280218 A1 | 9/2017 | Wang et al. | |
| 2018/0180724 A1* | 6/2018 | Zhang | H01L 41/0477 |
| 2019/0242985 A1* | 8/2019 | Ishii | G01S 7/521 |
| 2020/0322730 A1* | 10/2020 | Kamiya | G01N 29/12 |

FOREIGN PATENT DOCUMENTS

| | | | | |
|---|---|---|---|---|
| JP | S59-218098 A | | 12/1984 | |
| JP | 2005-051687 A | | 2/2005 | |
| JP | 2005051687 A | * | 2/2005 | |
| JP | 2006-094459 A | | 4/2006 | |
| JP | 2006094459 A | * | 4/2006 | B06B 1/0629 |
| JP | 2009-058298 A | | 3/2009 | |
| JP | 2009058298 A | * | 3/2009 | |
| JP | 2011-250327 A | | 12/2011 | |
| JP | 5004840 B2 | | 8/2012 | |
| JP | 2016-058880 A | | 4/2016 | |
| JP | 2016-146515 A | | 8/2016 | |
| JP | 2016146515 A | * | 8/2016 | B06B 1/06 |

OTHER PUBLICATIONS

JP-2009058298-A (Year: 2009).*
JP-2005051687-A (Year: 2005).*
JP-2016146515-A (Year: 2016).*
JP-2006094459-A translation (Year: 2006).*
Liljenberg, Scott Alan. "Modeling and Stability Analysis of Thermoacoustic Instabilities in Gas Turbine Combustor Sections."""Chapter 3—Basic Acoustic Modeling; p. 1-27." VTechWorks Home, Virginia Tech, Oct. 23, 2000, https://vtechworks.lib.vt.edu/handle/10919/35469. (Year: 2000).*
Cha, Jaemin, et al. "Comparison to Mechanical Properties of Epoxy Nanocomposites Reinforced by Functionalized Carbon Nanotubes and Graphene Nanoplatelets." Composites Part B: Engineering, Elsevier, Nov. 3, 2018, https://www.sciencedirect.com/science/article/pii/S1359836818323199. (Year: 2018).*
Fishbein, Meyer. "Physical Properties of Synthetic Resin Materials." UNT Digital Library, Nov. 14, 2011, https://digital.library.unt.edu/ark:/67531/metadc54592/. (Year: 2011).*
Jonghyun Eom, Chang-Ju Park, Byeong Ha Lee, Jong-Hyun Lee, Il-Bum Kwon, Euiheon Chung, "Fiberoptic Fabry-Perot pressure sensor based on lensed fiber and polymeric diaphragm, Sensors and Actuators A: Physical", vol. 225, 2015, pp. 25-32, ISSN 0924-4247, https://doi.org/10.1016/j.sna.2015.01.023. (Year: 2015).*

\* cited by examiner

ULTRASONIC SENSOR

CROSS REFERENCE TO RELATED APPLICATION

This application is based on Japanese Patent Application No. 2019-128691 filed on Jul. 10, 2019, the disclosure of which is incorporated herein by reference in its entirety.

TECHNICAL FIELD

The present disclosure relates to an ultrasonic sensor.

BACKGROUND

An ultrasonic sensor includes a case and a piezoelectric element. The case is formed in a bottomed cylindrical shape having a bottom and a side wall. The piezoelectric element is attached to the bottom of the case.

SUMMARY

According to an aspect of the present disclosure, an ultrasonic sensor includes:

an ultrasonic element provided to transmit or receive a propagating wave, which is an ultrasonic wave propagating along a directional axis; and an element housing case that houses the ultrasonic element and includes a case diaphragm, which is a vibration membrane or a vibrating plate having a thickness direction along the directional axis.

A resonant space is defined for the propagating wave between the case diaphragm and the ultrasonic element. A horn shape is defined in the element housing case in which a width of the resonant space in a direction orthogonal to the directional axis is reduced as the resonant space extends in an axial direction parallel to the directional axis.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
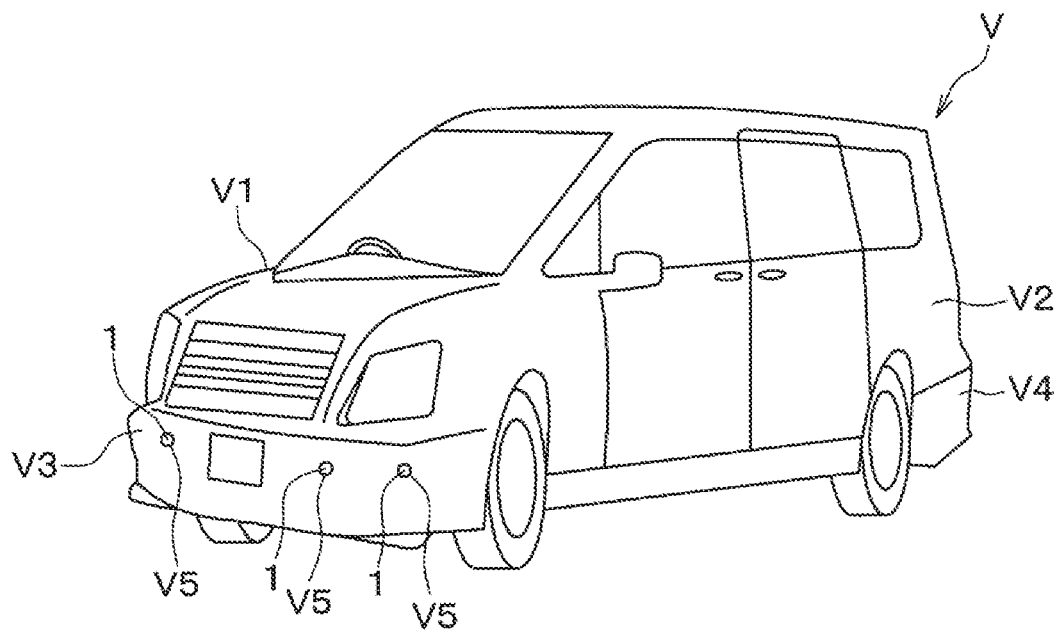
FIG. 1 is a perspective view illustrating a vehicle including an ultrasonic sensor according to a first embodiment.

An ultrasonic sensor includes a case and a piezoelectric element. The case is formed in a bottomed cylindrical shape having a bottom and a side wall.

In case where the piezoelectric element is attached to the bottom of the case in the ultrasonic sensor, the case housing an ultrasonic element such as the piezoelectric element is exposed to an external space in which a detection target is present. Specifically, for example, when the ultrasonic sensor is mounted on a vehicle, the ultrasonic sensor is mounted on an outer plate member such as a bumper in the vehicle in an in-vehicle state. For that reason, hard foreign matter such as pebbles may collide with the case.

In that case, in the ultrasonic sensor, there has been a concern that cracks occur in the ultrasonic element attached to the case or the ultrasonic element is peeled off from the case. In particular, when a Micro Electro Mechanical System (MEMS) type element is used, if such an element is attached to the bottom of the case, the element is liable to be damaged.

The present disclosure provides an ultrasonic sensor capable of satisfactorily protecting an ultrasonic element.

According to an aspect of the present disclosure, an ultrasonic sensor includes: an ultrasonic element provided to transmit or receive a propagating wave, which is an ultrasonic wave propagating along a directional axis; and an element housing case that houses the ultrasonic element and includes a case diaphragm, which is a vibration membrane or a vibrating plate having a thickness direction along the directional axis. A resonant space is defined for the propagating wave between the case diaphragm and the ultrasonic element. A horn shape is defined in the element housing case in which a width of the resonant space in a direction orthogonal to the directional axis is reduced as the resonant space extends in an axial direction parallel to the directional axis.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(In-Vehicle Configuration)

Referring to FIG. 1, in the present embodiment, an ultrasonic sensor 1 is mounted on a vehicle V as a clearance sonar. In other words, the ultrasonic sensor 1 is mounted on the vehicle V so that an object existing around the vehicle V can be detected.

The vehicle V is a so-called four-wheeled automobile and includes a box-shaped vehicle body V1. A vehicle body panel V2, a front bumper V3, and a rear bumper V4, which are vehicle body parts configuring an outer plate, are mounted on the vehicle body V1. The front bumper V3 is provided at a front end of the vehicle body V1. The rear bumper V4 is provided at a rear end of the vehicle body V1.

The ultrasonic sensor 1 is mounted on the front bumper V3 and the rear bumper V4 so as to detect an object existing in front of and behind the vehicle V. A state in which the ultrasonic sensor 1 is mounted on the front bumper V3 and the rear bumper V4 provided on the vehicle body V1 in the vehicle V is hereinafter referred to as a "in-vehicle state".

Specifically, in the in-vehicle state, multiple (for example, four) ultrasonic sensors 1 are mounted on the front bumper V3. The multiple ultrasonic sensors 1 mounted on the front bumper V3 are disposed at different positions in a vehicle width direction. In the same manner, multiple (for example, four) ultrasonic sensors 1 are mounted on the rear bumper V4. The front bumper V3 and the rear bumper V4 have mounting holes V5 as through holes for mounting the ultrasonic sensor 1.

First Embodiment

Figure 2:
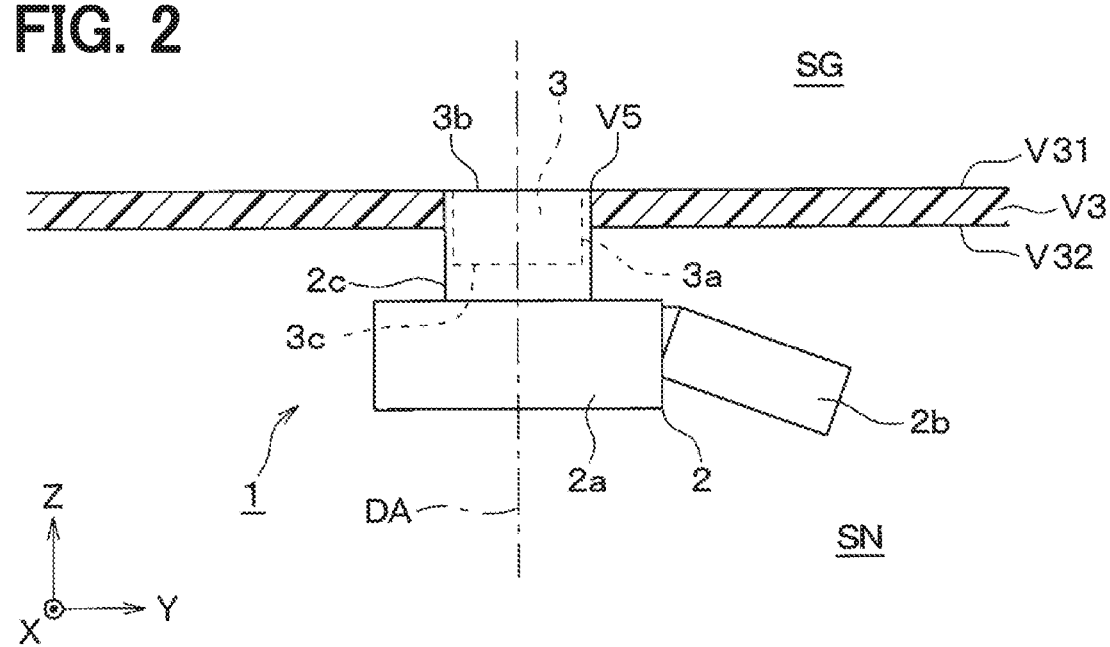
FIG. 2 is a schematic view illustrating the ultrasonic sensor of FIG. 1.

FIG. 2 shows one of the ultrasonic sensors 1 mounted on the front bumper V3 of the vehicle V. Hereinafter, the configuration of the ultrasonic sensor 1 according to the first embodiment will be described with reference to FIGS. 2 and 3.

Referring to FIG. 2, the front bumper V3 has a bumper outer surface V31 and a bumper back surface V32. The bumper outer surface V31 is an outer front surface of the front bumper V3 and provided so as to face an external space SG which is an external space of the vehicle V. The bumper back surface V32 is a surface on a rear side of the bumper outer surface V31 and provided so as to face an internal space SN which is a space inside the front bumper V3. The mounting hole V5 is opened at the bumper outer surface V31 and the bumper back surface V32 to penetrate through the front bumper V3 in a thickness direction.

The ultrasonic sensor 1 is configured to be capable of transmitting and receiving ultrasonic waves. In other words, the ultrasonic sensor 1 is configured to transmit a probe wave, which is ultrasonic waves, toward the external space SG along a directional axis DA. The "directional axis" is a virtual straight line extending along the transmission/reception direction of ultrasonic waves from the ultrasonic sensor 1, and serves as a reference of a directional angle. The "directional axis" may also be referred to as a directional center axis or a detection axis. The ultrasonic sensor 1 is configured to receive a wave including a reflected wave of the probe wave reflected by an object existing in the periphery from the external space SG, and to generate and output a detection signal in response to a reception result of the received wave.

For convenience of illustration, a right-handed system XYZ orthogonal coordinate system is set so that the Z-axis is parallel to the directional axis DA as shown in the drawing. At this time, the direction parallel to the directional axis DA is referred to as "axial direction". A "distal end side in the axial direction" is a side in the emission direction of the probe wave, and corresponds to an upper side, that is, a Z-axis positive direction side in FIGS. 2 and 3. On the other hand, a "proximal end side in the axial direction" corresponds to a lower side, that is, a Z-axis negative direction side in FIGS. 2 and 3.

An axial proximal end of a component is referred to as a "proximal end" and an axial distal end is referred to as a "distal end". An arbitrary direction orthogonal to the axial direction is referred to as a "plane direction". The "plane direction" is a direction parallel to the XY-plane in FIGS. 2 and 3. The "plane direction" may also be referred to as a "radial direction" in some cases. The "radial direction" is a direction orthogonal to the directional axis DA and is defined to extend and separate from the directional axis DA. In other words, the "radial direction" is a direction along which a half line extends when the half line is drawn in the virtual plane with an intersection point of the virtual plane orthogonal to the directional axis DA with the directional axis DA as a starting point. In other words, the "radial direction" is a radial direction of a circle when the circle is drawn in the virtual plane with the intersection point of the virtual plane orthogonal to the directional axis DA with the directional axis DA as the center.

The ultrasonic sensor 1 includes a sensor case 2 and an ultrasonic microphone 3. The sensor case 2 configuring a housing of the ultrasonic sensor 1 is made of an insulating synthetic resin. Specifically, the sensor case 2 includes a case main body 2a, a sensor side connector 2b, and a microphone housing portion 2c.

The case main body 2a is formed in a box shape. A control circuit board (not shown) and the like are housed inside the case main body 2a. The sensor side connector 2b extends from the case main body 2a in a direction intersecting with the directional axis DA. The sensor side connector 2b is configured to be detachably attached to a wire side connector (not shown) provided in a wire harnesses for electrically connecting to an external device such as an ECU. The ECU is an abbreviation for Electronic Control Unit.

The microphone housing portion 2c is a substantially cylindrical portion surrounding the directional axis DA, and protrudes from the case main body 2a toward a distal end in the axial direction. In the in-vehicle state, the distal end of the microphone housing portion 2c is housed in the mounting hole V5 so as to be in close contact with an inner wall surface of the mounting hole V5.

(Ultrasonic Microphone)

The ultrasonic microphone 3 is housed in the microphone housing portion 2c. In the present embodiment, the ultrasonic microphone 3 is configured to have a substantially columnar outer shape with the directional axis DA as a center axis. An outer surface of the ultrasonic microphone 3 has a lateral outer wall surface 3a, an exposed surface 3b, and an outer bottom surface 3c. The lateral outer wall surface 3a is formed in a columnar surface shape along the axial direction.

A sleeve member (not shown) is provided between an inner wall surface of the microphone housing portion 2c and the lateral outer wall surface 3a of the ultrasonic microphone 3. The sleeve member is made of silicone rubber or the like having an insulating property and rubber elasticity. In other words, a gap between an inner wall surface of a microphone housing portion 2c and a lateral outer wall surface 3a is sealed by the sleeve member described above so that a water hardly penetrates into the gap.

The exposed surface 3b is an outer surface intersecting with the directional axis DA and is formed in a flat circular planar shape. Specifically, in the present embodiment, the exposed surface 3b is provided so as to be orthogonal to the directional axis DA. The ultrasonic microphone 3 is housed in the microphone housing portion 2c so that the exposed surface 3b is exposed from the mounting hole V5 to the external space SG in the vehicle mounted position.

The outer bottom surface 3c is an outer surface intersecting with the directional axis DA, and is formed in a flat circular planar shape. Specifically, in the present embodiment, the outer bottom surface 3c is provided so as to be orthogonal to the directional axis DA. In other words, the outer bottom surface 3c is formed as a plane parallel to the exposed surface 3b. A proximal end of the ultrasonic microphone 3 including the outer bottom surface 3c in the axial direction is covered with the sensor case 2 and the above-mentioned sleeve member in the assembled state and the in-vehicle state. The "assembled state" is a state in which the ultrasonic sensor 1 is assembled by mounting the ultrasonic microphone 3 on the sensor case 2. The "in-vehicle state" also corresponds to the "assembled state".

Figure 3:
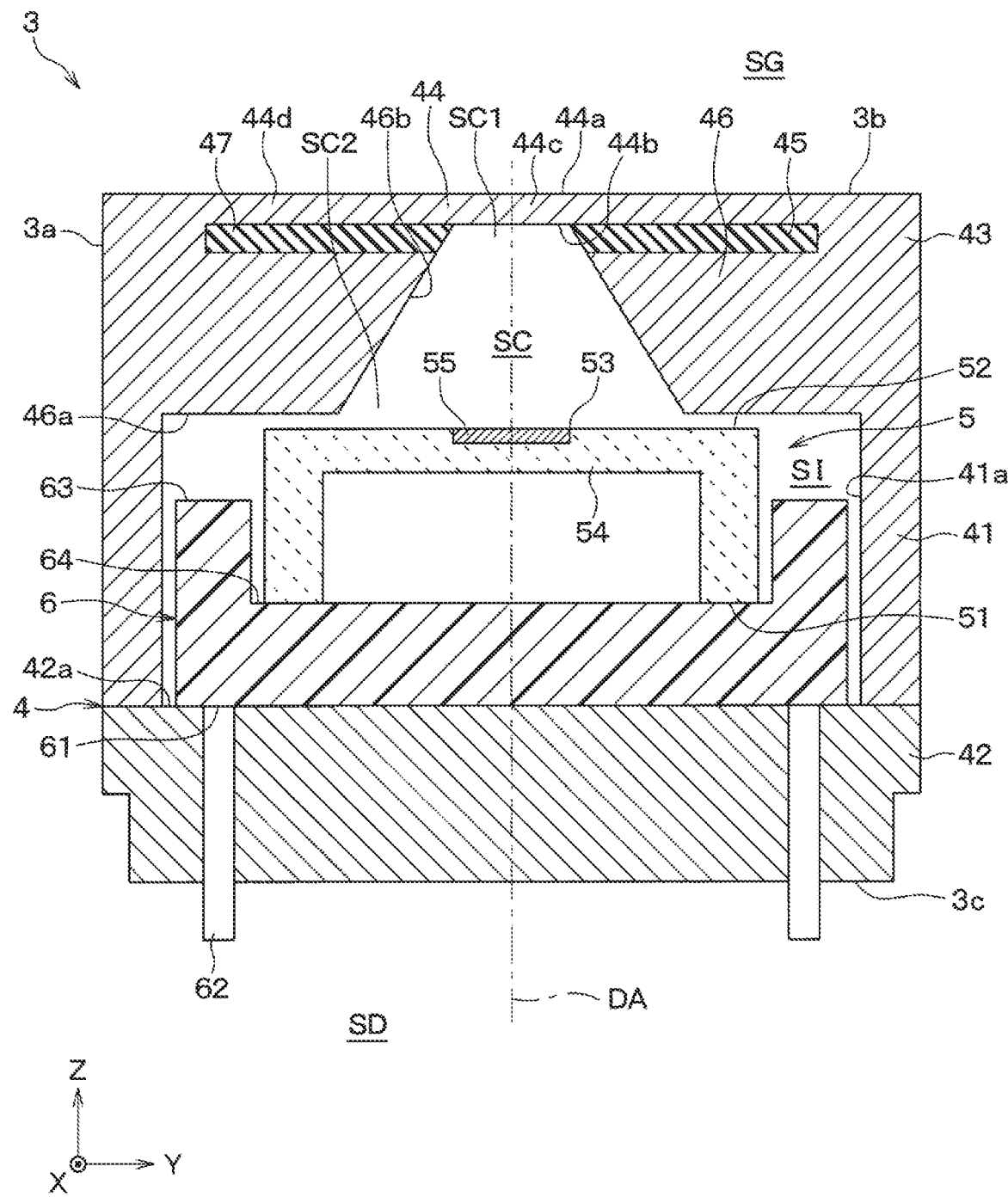
FIG. 3 is a schematic cross-sectional view illustrating an ultrasonic microphone of FIG. 2.

FIG. 3 shows a state in which the ultrasonic microphone 3 is taken out from the ultrasonic sensor 1 shown in FIG. 2. Referring to FIG. 3, the ultrasonic microphone 3 includes an element housing case 4, a semiconductor substrate 5, and a support substrate 6. Hereinafter, each part configuring the ultrasonic microphone 3 will be described. In order to simplify an illustration and a description, the illustration and description of an electrical connection structure such as wiring inside the ultrasonic microphone 3 will be omitted. The electrical connection structure described above can be appropriately formed based on a common general knowledge as of the filing of the present application.

The element housing case 4 configuring the housing of the ultrasonic microphone 3 is formed in a box shape having a substantially columnar outer shape. The element housing case 4 is configured to house the semiconductor substrate 5 and the support substrate 6 in an internal space SI which is a space inside the element housing case 4. In the present embodiment, the element housing case 4 is made of a metal material such as aluminum. As will be described later, the material configuring the element housing case 4 is not limited to a metal material such as aluminum.

The element housing case 4 has a side plate portion 41 formed in a cylindrical shape surrounding the directional axis DA. In the present embodiment, the side plate portion 41 is formed in a cylindrical shape having a center axis line substantially parallel to the directional axis DA. A columnar outer wall surface of the side plate portion 41 facing an external space SD, which is a space outside the element housing case 4, is provided so as to configure the lateral outer wall surface 3a of the ultrasonic microphone 3. The side inner wall surface 41a of the side plate portion 41, which is an inner wall surface facing the internal space SI, is formed in a cylindrical inner surface shape surrounding the directional axis DA.

The element housing case 4 also has an inner bottom plate portion 42 housed inside the microphone housing portion 2c shown in FIG. 2. The inner bottom plate portion 42 is provided so as to close one end side of the side plate portion 41, that is, the proximal end side in the axial direction. The inner bottom plate portion 42 is once formed as a separate member from the side plate portion 41, and is integrated with the side plate portion 41 by being hermetically and liquid-tightly joined to the proximal end of the side plate portion 41 by welding or the like.

The inner bottom plate portion 42 is formed in a plate shape having a thickness direction along the directional axis DA. The inner bottom plate portion 42 is provided so that a main surface facing the external space SD configures the outer bottom surface 3c of the ultrasonic microphones 3. The "main surface" is a surface of the plate shaped portion or member orthogonal to the thickness direction. The inner bottom plate portion 42 has an inner bottom surface 42a which is a main surface facing the internal space SI. The inner bottom surface 42a is formed in a flat circular planar shape intersecting with the directional axis DA. Specifically, in the present embodiment, the inner bottom surface 42a is provided so as to be orthogonal to the directional axis DA.

The element housing case 4 further includes an outer bottom plate portion 43 exposed to the outside from the microphone housing portion 2c shown in FIG. 2. The outer bottom plate portion 43 is formed in a plate shape having a thickness direction along the directional axis DA. The outer bottom plate portion 43 is provided so as to liquid-tightly close the other end side of the side plate portion 41, that is, a distal end side in the axial direction, so that liquid such as water does not enter into the internal space SI. The outer bottom plate portion 43 may also be referred to as a "top plate portion". In the present embodiment, the outer bottom plate portion 43 is formed integrally with the side plate portion 41 seamlessly.

The outer bottom plate portion 43 has a case diaphragm 44 which is a vibration membrane or a vibrating plate having a thickness direction along the directional axis DA. The case diaphragm 44 is a thin portion provided on the outer bottom plate portion 43, and is formed so as to ultrasonically vibrate in such a manner that the center portion in the plane direction moves in the axial direction. In the present embodiment, the case diaphragm 44 is formed to have a thickness of 0.5 mm or more in consideration of the fact that the ultrasonic sensor 1 is mounted on a vehicle. In other words, the case diaphragm 44 has a plate-like shape having a constant thickness of 0.5 mm or more. The case diaphragm 44 has a substantially circular shape in the plane direction, that is, in a plane orthogonal to the directional axis DA.

The case diaphragm 44 is provided on one side of the outer bottom plate portion 43 in the thickness direction. In other words, a transmission and reception surface 44a, which is a main surface of the case diaphragm 44 intersecting with the directional axis DA, is an outer surface facing the external space SG, and is provided so as to configure a part of the exposed surface 3b. The transmission and reception surface 44a and the diaphragm back surface 44b on a back side of the transmission and reception surface 44a are formed in a planar shape orthogonal to the directional axis DA.

A resonant space SC is provided between the case diaphragm 44 and the semiconductor substrate 5. In other words, the case diaphragm 44 is provided so as to face the semiconductor substrate 5 across the resonant space SC in the axial direction. The resonant space SC is a space in which a propagating wave, which is an ultrasonic wave propagating along the directional axis DA, propagates while resonating between the case diaphragm 44 and the semiconductor substrate 5, and is defined as a part of the internal space SI hermetically and liquid-tightly sealed by the element housing case 4. The case diaphragm 44 is configured to vibrate ultrasonically while being bent when the semiconductor substrate 5 transmits or receives the propagating wave.

The case diaphragm 44 has a central portion 44c and a ring-shaped portion 44d. The central portion 44c, which is a portion in the vicinity of the center in the plane direction of the case diaphragm 44, is formed in a substantially circular shape centered on the directional axis DA in a plan view with a sight line parallel to the axial direction. In other words, the central portion 44c is located adjacent to a space top SC1 in the axial direction, and has a planar shape corresponding to the shape of a top surface in the resonant space SC. The space top SC1 is an axial distal end of the resonant space SC, that is, an end of the resonant space SC adjacent to the case diaphragm 44. A proximal end of the resonant space SC in the axial direction, that is, an end of the resonant space SC closer to the semiconductor substrate 5, is referred to as a space bottom SC2. In the present embodiment, the resonant space SC is formed in a substantially truncated conical shape so that a radial dimension of the space bottom SC2 of the resonant space SC is larger than that of the space top SC1.

The ring-shaped portion 44*d* is an outer portion of the central portion 44*c* in the case diaphragm 44 in the radial direction, and is provided so as to face the slit portion 45 in the axial direction. The slit portion 45 extends radially from the space top SC1 to communicate with the space top SC1. The slit portion 45 has a radial dimension larger than the radial dimension of the space bottom SC2. In the present embodiment, the slit portion 45 is formed so that the axial dimension is ¼ or less of the wavelength of the propagating wave.

The element housing case 4 has a case thick portion 46. The case thick portion 46 is a thick portion formed around the case diaphragm 44 in the radial direction, and is provided so as to surround the resonant space SC from the outer side in the radial direction. In other words, the case thick portion 46 is configured to fixedly support an outer edge of the case diaphragm 44 in the radial direction. The case thick portion 46 has the slit portion 45. More specifically, the slit portion 45 is defined as a substantially columnar space provided by notching an axial distal end side of the case thick portion 46 in the radial direction.

As described above, the outer bottom plate portion 43 includes the case diaphragm 44, which is a thin portion, and the case thick portion 46. The case diaphragm 44 and the case thick portion 46 are seamlessly formed integrally.

An inner surface of the case thick portion 46 facing the internal space SI has a substrate facing surface 46*a* and a horn inner surface 46*b*. The substrate facing surface 46*a* is provided so as to face the semiconductor substrate 5 and the support substrate 6 in the axial direction. The substrate facing surface 46*a* is formed in a planar shape orthogonal to the axial direction. The substrate facing surface 46*a* is formed in a substantially ring shape in a plan view, and is provided outside the horn inner surface 46*b* in the radial direction.

The horn inner surface 46*b* is provided so as to configure the resonant space SC by facing the resonant space SC. The horn inner surface 46*b* is formed in the shape of a conical inner surface that tapers toward the case diaphragm 44 so that the space bottom SC2 has a larger radial dimension than the space top SC1. Specifically, in the present embodiment, the horn inner surface 46*b* is provided so as to form the outer edge in the radial direction in the resonant space SC which is a truncated conical space. In other words, the element housing case 4 has a horn shape in which the width of the resonant space SC in the plane direction is reduced toward the distal end side in the axial direction.

The slit portion 45 is filled with a spacer 47 which is an elastic body. The spacer 47 has an elastic modulus lower than that of the case diaphragm 44. Specifically, the spacer 47 is made of an elastomer such as silicone rubber. The elastic modulus is, for example, Young's modulus.

The semiconductor substrate 5 is an SOI substrate having a thickness direction along the directional axis DA, and is fixedly supported by the element housing case 4. The SOI is an abbreviation for Silicon On Insulator. Specifically, the semiconductor substrate 5 has a substrate bottom surface 51 which is a surface adjacent to the support substrate 6, and a substrate upper surface 52 which is a surface facing the case diaphragm 44. The substrate bottom surface 51 is joined to the support substrate 6 fixed to the inner bottom surface 42*a* of the inner bottom plate portion 42. In other words, the semiconductor substrate 5 is fixedly joined to the inner bottom plate portion 42 through the support substrate 6.

The substrate upper surface 52 is one main surface of the semiconductor substrate 5, and is formed in a substantially planar shape orthogonal to the axial direction. The substrate upper surface 52 is provided so as to closely face the substrate facing surface 46*a* of the case thick portion 46 in a non-contact state in the axial direction. Specifically, the semiconductor substrate 5 is disposed so that a gap between an ultrasonic element 53, that is, the substrate upper surface 52, and the case thick portion 46 in the axial direction is ¼ or less of the wavelength of the propagating wave.

The semiconductor substrate 5 has the ultrasonic element 53 having a function of converting electric signals and ultrasonic vibrations. In the present embodiment, the ultrasonic element 53 is a MEMS type element provided on the semiconductor substrate 5, and is provided to transmit and receive the propagating wave propagating along the directional axis DA. In other words, the semiconductor substrate 5 has a configuration as a MEMS type piezoelectric transducer.

Specifically, the ultrasonic element 53 includes an element diaphragm 54 and a circuit element portion 55. The element diaphragm 54 is a vibration membrane or a vibrating plate formed on the semiconductor substrate 5 and has a thickness direction along the directional axis DA. The element diaphragm 54 is formed as a thin portion in the semiconductor substrate 5.

The element diaphragm 54 is provided so as to ultrasonically vibrate while being bent when the semiconductor substrate 5 transmits and receives the propagating wave. In other words, the element diaphragm 54 is formed so as to ultrasonically vibrate in the same direction as the case diaphragm 44 in such a manner that the center portion in the plane direction moves in the axial direction.

The element diaphragm 54 has a radial dimension corresponding to the radial dimension of the space bottom SC2. Specifically, the element diaphragm 54 is formed in a circular shape having the same diameter as the diameter of the space bottom SC2 or a diameter slightly larger than the diameter of the space bottom SC2 in a plan view along a sight line parallel to the axial direction. As described above, in the present embodiment, the element diaphragm 54 has a radial dimension that substantially coincides with the radial dimension of the space bottom SC2.

The circuit element portion 55 is provided at a substantially central portion of the element diaphragm 54 in the radial direction. In the present embodiment, the circuit element portion 55 is a piezoelectric element in which a piezoelectric film and a thin film electrode are stacked on each other, and is formed on the substrate upper surface 52 side which is a surface of the element diaphragm 54 facing the resonant space SC.

In other words, the ultrasonic element 53 has a configuration as a PMUT. The PMUT is an abbreviation for Piezoelectric Micro-machined Ultrasonic Transducers. More specifically, the ultrasonic element 53 is configured such that the element diaphragm 54 ultrasonically vibrates based on a drive voltage which is an AC voltage applied to the circuit element portion 55. The ultrasonic element 53 is configured to generate an output voltage corresponding to a vibration state of the element diaphragm 54 in the circuit element portion 55.

As described above, the ultrasonic element 53 is housed inside the element housing case 4 and is disposed away from the case diaphragm 44. The resonant space SC is defined between the case diaphragm 44 and the ultrasonic element 53. The resonant space SC is provided so that the axial dimension is K·(λ/2+Nλ) when the wavelength of the propagating wave is λ, N is an integer of 0 or more, and K is in a range from 0.9 to 1.1. In the present embodiment, the axial dimension of the resonant space SC is a distance between the diaphragm back surface 44b and the substrate facing surface 46a in the axial direction.

In the present embodiment, the ultrasonic element 53, the resonant space SC, and the case diaphragm 44 are configured to have a resonance frequency of 30 kHz to 100 kHz. The ultrasonic element 53, the resonant space SC, and the case diaphragm 44 are configured to have substantially the same resonance frequency. More specifically, the resonance frequency in the ultrasonic element 53 is set as a first resonance frequency, the resonance frequency in the resonant space SC is set as a second resonance frequency, and the resonance frequency in the case diaphragm 44 is set as a third resonance frequency. The first resonance frequency is a structural resonance frequency of the ultrasonic element 53. The second resonance frequency is a resonant frequencies in the resonant space SC. The third resonance frequency is a structural resonance frequency of the case diaphragm 44. A maximum value among a difference between the first resonance frequency and the second resonance frequency, a difference between the second resonance frequency and the third resonance frequency, and a difference between the first resonance frequency and the third resonance frequency is defined as Δfr. Further, a bandwidth of the widest resonance band among the resonance bands of the ultrasonic element 53, the resonant space SC, and the case diaphragm 44 is defined as BW. At this time, the ultrasonic element 53, the resonant space SC, and the case diaphragm 44 are configured to satisfy the relationship pf Δfr≤BW.

The "resonance band" is a frequency band between two frequencies fa and fb which decreases by 3 dB from a peak value in an output curve or a characteristic curve having a resonance frequency as a peak. "Decrease by 3 dB from peak value" can also be referred to as "1/√2 times the peak value". The "resonance band" may also be referred to as the "resonance band of the structural resonance" or the "3 dB band of the resonance peak". The bandwidth may also be referred to as "−3 dB bandwidth", "3 dB bandwidth", or simply "frequency bandwidth". Δfr is a maximum value of the amount of deviation of the resonance frequency among the case diaphragm 44, the ultrasonic element 53, and the resonant space SC.

As described above, the semiconductor substrate 5 is fixedly supported by the element housing case 4 while being disposed so that the resonant space SC is defined between the case diaphragm 44 and the element diaphragm 54. The resonant space SC has a function as an acoustic resonant space provided in the element housing case 4. In other words, the resonant space SC is provided so that the ultrasonic vibration of the propagating wave propagates between the case diaphragm 44 and the element diaphragm 54 by a coupled resonance.

The support substrate 6 is a member that fixedly supports the semiconductor substrate 5 having the ultrasonic element 53, and is formed in a plate shape having a thickness direction along the directional axis DA. The support substrate 6 is fixed to the inner bottom plate portion 42 by a case fixing surface 61, which is one main surface, being joined to the inner bottom surface 42a of the inner bottom plate portion 42.

The support substrate 6 has connection terminals 62 for electrical connection between the ultrasonic microphone 3 and the control circuit board or the like on the sensor case 2 side shown in FIG. 2. The connection terminals 62 protrude from the case fixing surface 61 along the axial direction. The connection terminals 62 protrude from the inner bottom plate portion 42 by penetrating through the inner bottom plate portion 42. Portions where the connection terminals 62 penetrate through the inner bottom plate portion 42 are liquid-tightly sealed by a sealant.

The mounting surface 63 of the support substrate 6 on the opposite side to the case fixing surface 61 is provided so as to face the internal space SI. The semiconductor substrate 5 is fixed on the mounting surface 63. Specifically, the mounting surface 63 is provided with a recess portion 64. The semiconductor substrate 5 is housed inside the recess portion 64 and fixed to the support substrate 6. An electrode pad (not shown) provided around the recess portion 64 of the mounting surface 63 is electrically connected to an electrode pad (not shown) provided on the semiconductor substrate 5 through a wiring such as a bonding wire.

Advantages

Hereinafter, an outline of an operation according to the configuration of the present embodiment will be described with reference to the drawings, together with advantages achieved by the configuration.

In the in-vehicle state, the exposed surface 3b of the ultrasonic microphone 3 including the transmission and reception surface 44a which is the outer surface of the case diaphragm 44 provided on the outer bottom plate portion 43 is exposed to the external space SG. For that reason, when the vehicle V is traveling or the like, hard foreign matter such as pebbles may collide with the exposed surface 3b, that is, the transmission and reception surface 44a.

In this regard, in the configuration described above, the ultrasonic element 53 is housed inside the element housing case 4 formed in a box shape, and is disposed apart from the case diaphragm 44. In other words, the ultrasonic element 53 is not attached to the outer bottom plate portion 43 exposed to the external space SG in the in-vehicle state.

For that reason, even if a hard foreign matter such as a pebble collides with the exposed surface 3b, an impact caused by the collision does not directly act on the ultrasonic element 53. For that reason, the occurrence of cracks or the like in the ultrasonic element 53 can be prevented satisfactorily. In particular, even if the outer bottom plate portion 43 is not formed thick, the occurrence of a defect such as a crack in the ultrasonic element 53 can be avoided satisfactorily. For that reason, the ultrasonic element 53 can be satisfactorily protected while avoiding an increase in the size of the ultrasonic sensor 1.

In addition, the distal end in the axial direction of the element housing case 4 configuring the housing of the ultrasonic microphone 3 is liquid-tightly closed. For that reason, the penetration of liquid such as water into the element housing case 4 from the exposed surface 3b, that is, the external space SG is satisfactorily inhibited.

Further, a portion of the element housing case 4 configuring the housing of the ultrasonic microphone 3 on the proximal end side in the axial direction is covered by the sensor case 2 and the sleeve member in the assembled state. For that reason, the penetration of liquid such as water into the element housing case 4 from the internal space SN is satisfactorily inhibited.

As described above, according to the above configuration, the ultrasonic element 53 and the resonant space SC are well protected from the intrusion of water or the like. Therefore, the occurrence of troubles such as a failure in the ultrasonic element 53 or a variation in the resonant frequencies in the resonant space SC due to the penetration of water or the like is satisfactorily inhibited.

The element diaphragm 54 provided with the ultrasonic element 53 is disposed facing the case diaphragm 44 across the resonant space SC. In other words, the resonant space SC is provided between the element diaphragm 54, which is a thin portion of the semiconductor substrate 5, and the case diaphragm 44, which is a thin portion of the outer bottom plate portion 43. The resonant space SC is defined as a liquid-tight and air-tight space. For that reason, the ultrasonic vibration of the propagating wave propagates well between the element diaphragm 54, that is, the ultrasonic element 53, and the case diaphragm 44 through the medium (e.g., air) in the resonant space SC.

Specifically, at the time of transmission of the probe wave, ultrasonic vibration generated in the ultrasonic element 53 by application of the drive voltage propagates as a propagating wave to the medium in the resonant space SC. The ultrasonic vibration of the propagating wave propagated to the medium in the resonant space SC propagates to the case diaphragm 44. The ultrasonic vibration of the case diaphragm 44 accompanying the propagation of the propagating wave to the case diaphragm 44 causes a probe wave to be transmitted toward the external space SG. Conversely, at the time of reception, the ultrasonic vibration of the case diaphragm 44 excited by the received wave from the external space SG propagates as a propagating wave to the medium in the resonant space SC. The ultrasonic vibration of the propagating wave propagated to the medium in the resonant space SC propagates to the element diaphragm 54. As a result, an output voltage is generated in the circuit element portion 55.

As described above, the ultrasonic vibration generated in one of the ultrasonic element 53 and the case diaphragm 44 propagates to the other by the coupled resonance through the medium in the resonant space SC. In particular, in the present embodiment, when the wavelength of the propagating wave is $\lambda$, N is an integer of 0 or more, and K is in a range from 0.9 to 1.1, the resonant space SC is provided so that the axial dimension is $K \cdot (\lambda/2 + N\lambda)$. Therefore, the propagation efficiency of the propagating wave propagating between the ultrasonic element 53 and the case diaphragm 44 becomes excellent.

The ultrasonic sensor 1 is configured such that the first resonance frequency, the second resonance frequency, and the third resonance frequency coincide with each other. The first resonance frequency is a resonance frequency, that is, a structural resonance frequency, of the ultrasonic element 53. The second resonance frequency is a resonance frequency, that is, a resonant frequencies, in the resonant space SC. The third resonance frequency is the resonance frequency, that is, the structural resonance frequency, of the case diaphragm 44. Therefore, the propagation efficiency of the propagating wave between the ultrasonic element 53 and the case diaphragm 44 becomes excellent.

As described above, according to the above configuration, the propagation of the ultrasonic vibration between the external space SG of the vehicle body and the ultrasonic element 53 can be satisfactorily realized while satisfactorily protecting the ultrasonic element 53. In particular, even if a MEMS type configuration is used as the ultrasonic elements 53, which is harder to obtain a large power than a bulk-type configuration, an excellent transmission and reception performance can be realized by efficiently propagating ultrasonic vibrations by the coupled resonance. In addition, as the in-vehicle ultrasonic sensor 1, in order to secure the strength of the element housing case 4, even if the case diaphragm 44 exposed to the external space SG is formed to have a thickness of 0.5 mm or more, an excellent transmission and reception performance can be realized.

However, in manufacturing, it is difficult that the first resonance frequency, the second resonance frequency, and the third resonance frequency completely coincide with each other. Therefore, in order to make the first resonance frequency, the second resonance frequency, and the third resonance frequency substantially coincide with each other, it is to be considered how much the difference among those resonance frequencies is kept.

In this respect, the joint inventors including the first inventor of the present invention have found conditions under which the first resonance frequency, the second resonance frequency, and the third resonance frequency substantially coincide with each other as a result of intensive studies. The condition is $\Delta fr \leq BW$, where $\Delta fr$ is a maximum value among a difference between the first resonance frequency and the second resonance frequency, a difference between the second resonance frequency and the third resonance frequency, and a difference between the first resonance frequency and the third resonance frequency. The BW is a bandwidth of the widest resonance band among the resonance bands of the ultrasonic element 53, the resonant space SC, and the case diaphragm 44. As a result, the excellent transmission/reception characteristics can be obtained.

In the present embodiment, the element housing case 4 has a horn shape in which the width of the resonant space SC in the plane direction is reduced as extended in the axial direction. Specifically, the element housing case 4 has the case thick portion 46 formed around the case diaphragm 44 in the radial direction and provided so as to surround the resonant space SC from the outside. The case thick portion 46 has the horn inner surface 46b which faces the resonant space SC to thereby configure the resonant space SC. The horn inner surface 46b is formed in the shape of a conical inner surface that tapers toward the case diaphragm 44 so that the space bottom SC2 has a larger radial dimension than the space top SC1.

According to the configuration described above, a cross-sectional area of the resonant space SC is narrowed in the propagation direction of the propagating wave from the ultrasonic element 53 to the case diaphragm 44 at the time of transmission of the probe wave. This makes it possible to increase the propagating wave and a sound pressure of the probe wave by the propagating wave.

Figure 4:
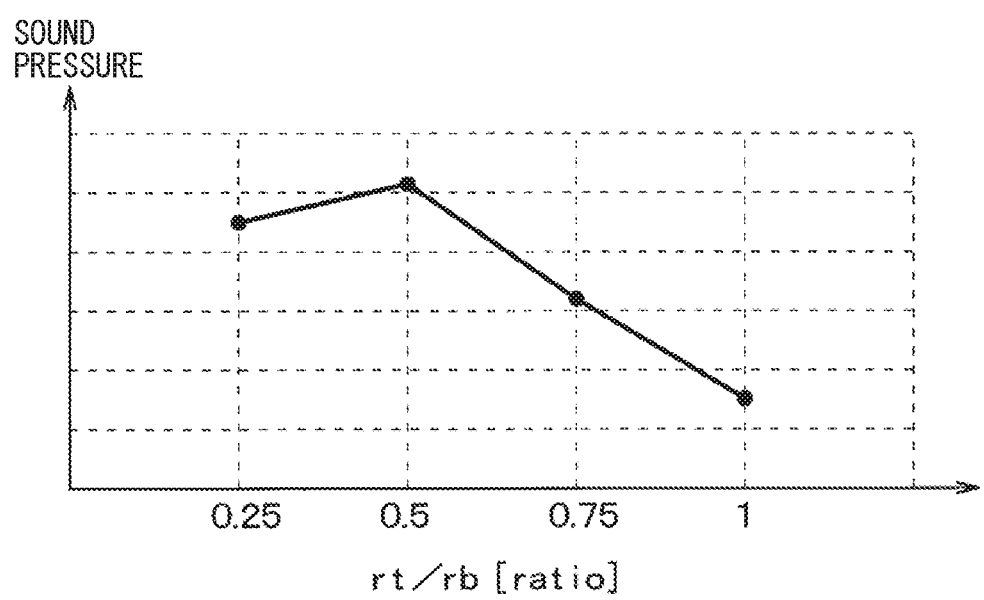
FIG. 4 is a graph representing calculator simulation results regarding effects by a shape of resonant space of FIG. 3.

FIG. 4 shows a result of a computer simulation of a change in sound pressure due to a change in shape of the resonant space SC. In FIG. 4, the abscissa rt/rb represents a ratio between a top surface diameter rt and a bottom surface diameter rb in the truncated cone shape of the resonant space SC, which is referred to as a radial ratio. The top surface diameter rt is a radius of a top surface of the resonant space SC on the space top SC1 side. The bottom surface diameter rb is a radius of a bottom surface of the resonant space SC on the space bottom SC2 side. When the radial ratio rt/rb is 1, the resonant space SC has a substantially columnar shape.

As shown in the results of computer simulations in FIG. 4, when the radial ratio rt/rb is 0.5, the sound pressure can be improved to the maximum by narrowing the cross-sectional area of the resonant space SC at the time of transmission of the propagating waves. Therefore, a radial ratio rt/rb is preferably in a range from 0.25 to 0.75, more preferably from 0.25 to 0.55, and most preferably 0.5 and a value dose to 0.5. The radial ratio of "0.5 and a value dose to 0.5" is $0.5 \cdot \beta$. $\beta$ is a real number dose to 1, for example, in a range from 0.9 to 1.1. In other words, "0.5 and a value close to 0.5" is, for example, $0.5 \pm 10\%$, specifically, 0.45 to 0.55. In particular, taking into consideration a gradient of a change in the sound pressure of around 0.5, when the radial ratio rt/rb is set to 0.5 or a value dose to 0.5, it is preferable that a dimensional tolerance of the top surface diameter rt is a negative tolerance, while the dimensional tolerance of the bottom surface diameter rb is a positive tolerance.

In the present embodiment, the ultrasonic element 53 has the element diaphragm 54 which is a vibration membrane or a vibrating plate formed on the semiconductor substrate 5 and has a thickness direction along the directional axis DA. The element diaphragm 54 has a radial dimension corresponding to the radial dimension of the space bottom SC2, that is, a radial dimension substantially coinciding with the radial dimension of the space bottom SC2.

According to the configuration described above, the propagating wave emitted by the vibrations of the element diaphragm 54 enters the space bottom SC2 in a substantially plane wave form. This makes it possible to increase the propagating wave and a sound pressure of the probe wave by the propagating wave.

In the present embodiment, the semiconductor substrate 5 is fixedly supported by the element housing case 4 so that a gap between the ultrasonic element 53 and the case thick portion 46 in the axial direction is equal to or less than ¼ of the wavelength of the propagating wave. In other words, a gap between the substrate facing surface 46a of the case thick portion 46 and the substrate upper surface 52 of the semiconductor substrate 5 is set to be sufficiently smaller than the wavelength of the propagating wave.

According to the configuration described above, leakage of ultrasonic vibrations to the outside of the resonant space SC can be inhibited as much as possible. Therefore, the propagation efficiency of the propagating wave between the case diaphragm 44 and the ultrasonic element 53 can be improved.

In the present embodiment, the case thick portion 46 has the slit portion 45 extending radially from the space top SC1 so as to communicate with the space top SC1. The case diaphragm 44 has the central portion 44c that faces the space top SC1 in the axial direction, and the ring-shaped portion 44d that faces the slit portion 45 in the axial direction. Further, the slit portion 45 has a radial dimension larger than the radial dimension of the space bottom SC2.

According to the configuration described above, the vibration area of the case diaphragm 44 can be made as large as possible while securing the sound pressure concentration effect by narrowing the cross-sectional area of the resonant space SC toward the case diaphragm 44. This makes it possible to achieve the excellent transmission/reception sensitivity.

In the present embodiment, the slit portion 45 is formed so that the axial dimension is ¼ or less of the wavelength of the propagating wave. According to the configuration described above, an acoustic impedance of the slit portion 45 increases, and the medium (for example, air) in the resonant space SC hardly intrudes into the slit portion 45. Therefore, the sound pressure concentration effect by narrowing the cross-sectional area of the resonant space SC toward the case diaphragm 44 can be satisfactorily ensured.

In the present embodiment, the slit portion 45 is filled with the spacer 47 which is an elastic body. The spacer 47 has an elastic modulus lower than that of the case diaphragm 44. According to the configuration described above, the leakage of ultrasonic vibrations from the resonant space SC to the slit portion 45 can be inhibited as much as possible. In addition, the presence of the spacer 47 can satisfactorily inhibit the ultrasonic vibration in the case diaphragm 44 from being disturbed. Therefore, the propagation efficiency of the propagating wave between the case diaphragm 44 and the ultrasonic element 53 can be maintained satisfactorily while increasing the vibration area of the case diaphragm 44 as much as possible.

In the present embodiment, the element housing case 4 is formed so as to hermetically and liquid-tightly seal the resonant space SC. For that reason, the medium (for example, air) in the resonant space SC between the case diaphragm 44 and the ultrasonic element 53 functions well as a fluid spring for propagating ultrasonic vibrations. In other words, the resonant space SC is airtightly provided, so that the intensity of sparse and dense waves between the ultrasonic element 53 and the case diaphragm 44 can be increased. Therefore, according to the configuration described above, excellent transmission/reception characteristics can be obtained.

In the configuration described above, the ultrasonic element 53 is formed on the semiconductor substrate 5 as a MEMS type semiconductor device. According to the configuration described above, the semiconductor substrate 5 can be satisfactorily downsized while maintaining the transmission/reception performance of the ultrasonic element 53. Therefore, for example, as in an eighth embodiment to be described later, in the case where multiple ultrasonic elements 53 are arrayed in the plane direction to enhance the function of the ultrasonic sensor 1, the body size of the ultrasonic sensor 1 can be inhibited from being enlarged as much as possible.

Second Embodiment

Hereinafter, a second embodiment will be described with reference to FIG. 5. In the following description of the second embodiment, portions different from those of the first embodiment will be mainly described. In the first embodiment and the second embodiment, portions that are the same or equivalent to each other are denoted by the same reference numerals. Therefore, in the following description of the second embodiment, the description of the first embodiment may be appropriately incorporated for the components having the same reference numerals as those of the first embodiment, unless there is a technical contradiction or a special additional description.

Figure 5:
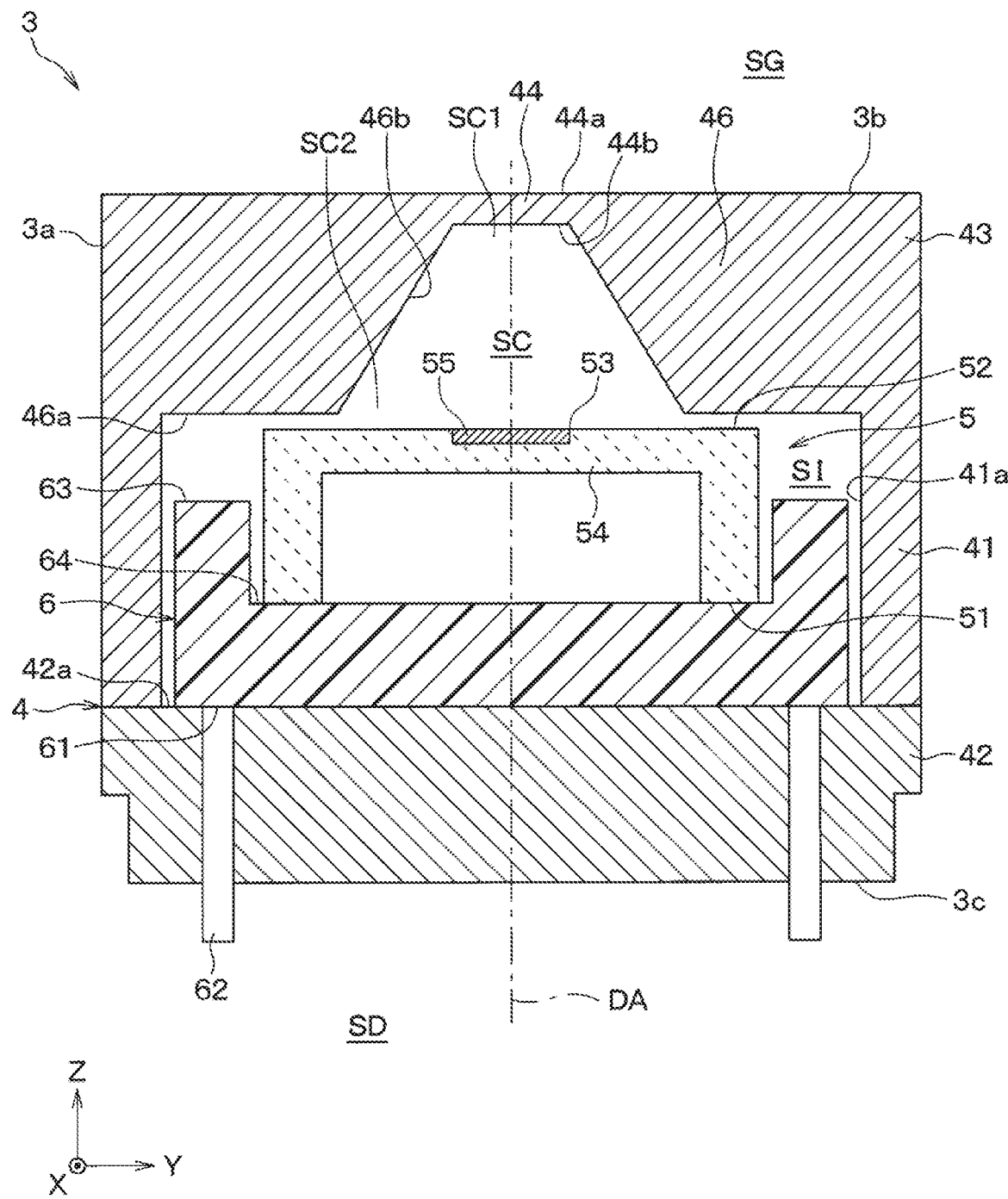
FIG. 5 is a schematic cross-sectional view illustrating an ultrasonic microphone according to a second embodiment.

As shown in FIG. 5, in the present embodiment, the slit portion 45 and the spacer 47 shown in FIG. 3 are omitted. In other words, a case diaphragm 44 is formed as a thin portion provided in the vicinity of the center in the plane direction of an outer bottom plate portion 43.

In the configuration described above, a vibration area of the case diaphragm 44 is reduced as compared with the case of the first embodiment. However, a sound pressure improvement effect by narrowing the cross-sectional area of the resonant space SC at the time of transmission of the propagating wave can be sufficiently exhibited.

Third Embodiment

Hereinafter, a third embodiment will be described with reference to FIG. 6. In the following description of the third embodiment, portions different from those of the second embodiment will be mainly described. In the second embodiment and the third embodiment, portions which are the same or equivalent to each other are denoted by the same reference numerals. Therefore, in the following description of the third embodiment, the description in the other embodiment may be appropriately incorporated for the components having the same reference numerals as those in the other embodiment described above, unless there is a technical contradiction or a special additional description. The same applies to a fourth embodiment and subsequent other embodiments, which will be described later.

Figure 6:
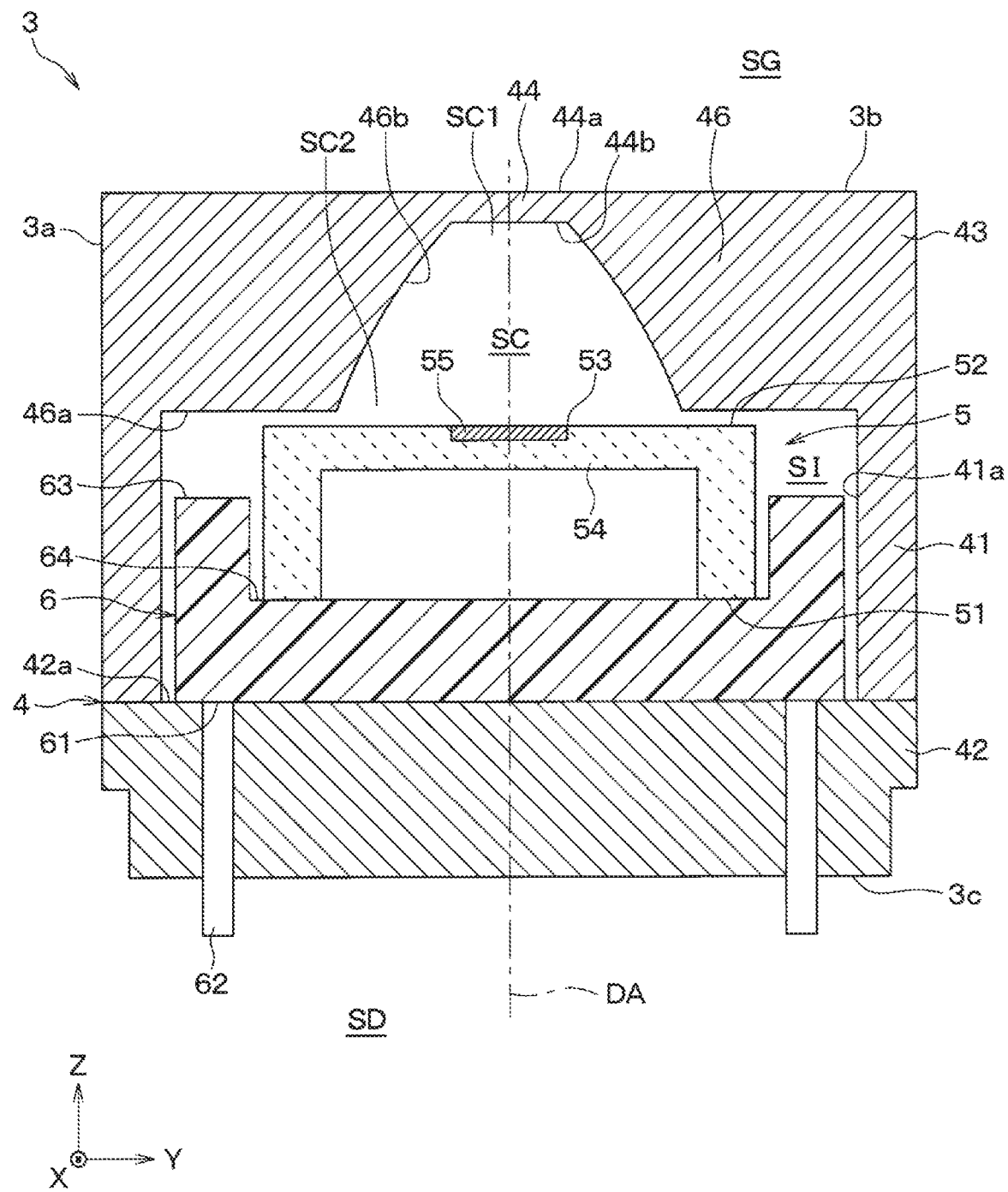
FIG. 6 is a schematic cross-sectional view illustrating an ultrasonic microphone according to a third embodiment.

Depending on the transmission and reception frequency of an ultrasonic microphone 3, it is preferable to form a horn inner surface 46b in a curved shape as shown in FIG. 6. A shape of the curved surface of the horn inner surface 46b may be, for example, hyperbolic, parabolic, exponential, or the like in a cross-sectional view, depending on the transmission and reception frequency. A shape of the curved surface of the horn inner surface 46b may be set to be concave or convex toward the resonant space SC according to the transmission and reception frequency.

Fourth Embodiment

Figure 9:
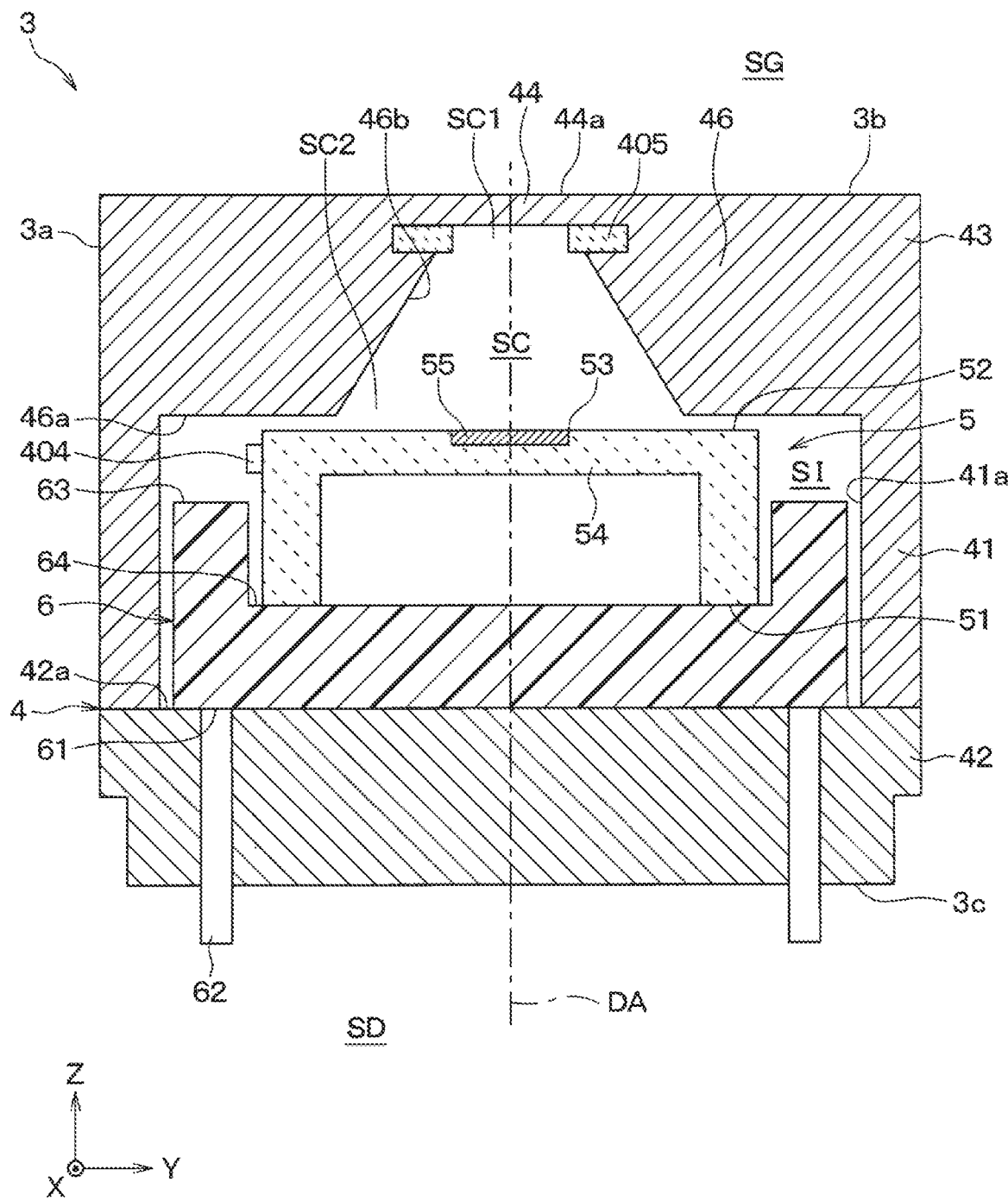
FIG. 9 is a schematic cross-sectional view illustrating an ultrasonic microphone according to a sixth embodiment.

Hereinafter, a fourth embodiment will be described with reference to FIG. 7. In the present embodiment, a damping member 401 is housed in the resonant space SC. The damping member 401 is provided so as to exert a damper effect against vibration in a case diaphragm 44. Specifically, for example as shown in FIG. 9, the damping member 401 is a plate-like member made of synthetic resin such as synthetic rubber and is attached to a diaphragm back surface 44b.

According to the configuration described above, the generation of reverberation in an ultrasonic microphone 3 is satisfactorily reduced. As a result, a dead zone time in an ultrasonic sensor 1 is shortened, thereby improving a short distance detection performance.

Fifth Embodiment

Hereinafter, a fifth embodiment will be described with reference to FIG. 8. In the present embodiment, an element housing case 4 has a vent 402. The vent 402 is provided in an inner bottom plate portion 42. Specifically, the vent 402 is a through hole that penetrates through an inner bottom plate portion 42 in a thickness direction, and is provided so as to communicate an internal space SI inside an element housing case 4 with an external space SD outside the element housing case 4.

The vent 402 is sealed in a liquid-tight manner so that air can pass through the vent 402 while a liquid is inhibited from passing through the vent 402. Specifically, for example as shown in FIG. 8, a vent sealing member 403 is attached to the vent 402. The vent sealing member 403 is made of a porous material through which air can pass but through which liquid is difficult to pass.

In the configuration described above, gas can be exchanged between the internal space SI inside the element housing case 4 and the external space SD outside the element housing case 4. This makes it possible to discharge the volatile component of the adhesive or the like to the outside of the element housing case 4.

In addition, a portion of the internal space SI located on the opposite side of a resonant space SC across the element diaphragm 54 can be communicated with the outside air. As a result, a resistance at the time of deformation of the element diaphragm 54 is reduced, and a reception sensitivity is improved. Further, with provision of the vent sealing member 403, the penetration of liquid such as water into the inside of the element housing case 4 at the vent 402 can be satisfactorily inhibited.

Sixth Embodiment

Hereinafter, a sixth embodiment will be described with reference to FIG. 9. In the present embodiment, an ultrasonic microphone 3 includes a temperature sensor 404 and a frequency changing unit 405.

The temperature sensor 404 is provided to generate an output corresponding to an operating environment temperature of an ultrasonic sensor 1. As shown in FIG. 9, the temperature sensor 404 is housed in an internal space SI. In other words, the temperature sensor 404 generates an output corresponding to a temperature of a space around the ultrasonic element 53. Specifically, the temperature sensor 404 is fixed on a semiconductor substrate 5.

The frequency changing unit 405 is provided to change a vibration frequency in a case diaphragm 44 or a resonant space SC in response to the operating environment temperature of the ultrasonic sensor 1. The operation of the frequency changing unit 405 is controlled by a control IC mounted on a control circuit board (not shown) housed inside the case main body 2a shown in FIG. 2.

As shown in FIG. 9, the frequency changing unit 405 is provided to change a structural resonance frequency of a case diaphragm 44 based on the output of the temperature sensor 404. Specifically, the frequency changing unit 405 is a piezoelectric element made of a bulk piezoelectric ceramic such as bulk PZT, and is configured to generate distortion by voltage application. The PZT is an abbreviation for lead zirconate titanate. In other words, the frequency changing unit 405 is attached to a case diaphragm 44 or a position close to the case diaphragm 44 in the element housing case 4, so as to adjust an internal stress or tension in the case diaphragm 44 by strain at the time of voltage application.

When the operating environment temperature of the ultrasonic sensor 1 changes, a resonance frequency of the case diaphragm 44 shifts. When the resonance frequency of the case diaphragm 44 shifts, a difference between the resonance frequency of the case diaphragm 44 and the resonance frequency of the ultrasonic element 53 increases. Then, a vibration propagation efficiency between the ultrasonic element 53 and the case diaphragm 44 decreases.

Therefore, in the present embodiment, the temperature sensor 404 and the frequency changing unit 405 are provided. In the configuration described above, the temperature sensor 404 generates an output corresponding to the operating environment temperature of the ultrasonic sensor 1. As a result, the operating environment temperature of the ultrasonic sensor 1 can be detected. The frequency changing unit 405 changes the resonance frequency of the case diaphragm 44 in response to the detected operating environment temperature. Specifically, a control voltage is applied to the frequency changing unit 405 in response to the detected operating environment temperature. The frequency changing unit 405 adjusts an internal stress, that is, a tension, in the case diaphragm 44 by generating a strain in accordance with the applied control voltage.

According to the configuration described above, the deviation of a resonance condition due to a change in the operating environment temperature can be compensated well. In addition, the resonance frequency of the case diaphragm 44 can be controlled independently of the resonant frequencies in the resonant space SC and the resonance frequency in the ultrasonic element 53.

The frequency changing unit 405 shown in FIG. 9 may be configured to change the vibration frequency in the resonant space SC by changing a volume of the resonant space SC. In that case, the frequency changing unit 405 changes the resonant frequencies in the resonant space SC in response to the detected operating environment temperature. In addition, the resonant frequencies in the resonant space SC can be controlled independently of the resonance frequencies in the case diaphragm 44 and the ultrasonic element 53.

Seventh Embodiment

Figure 10:
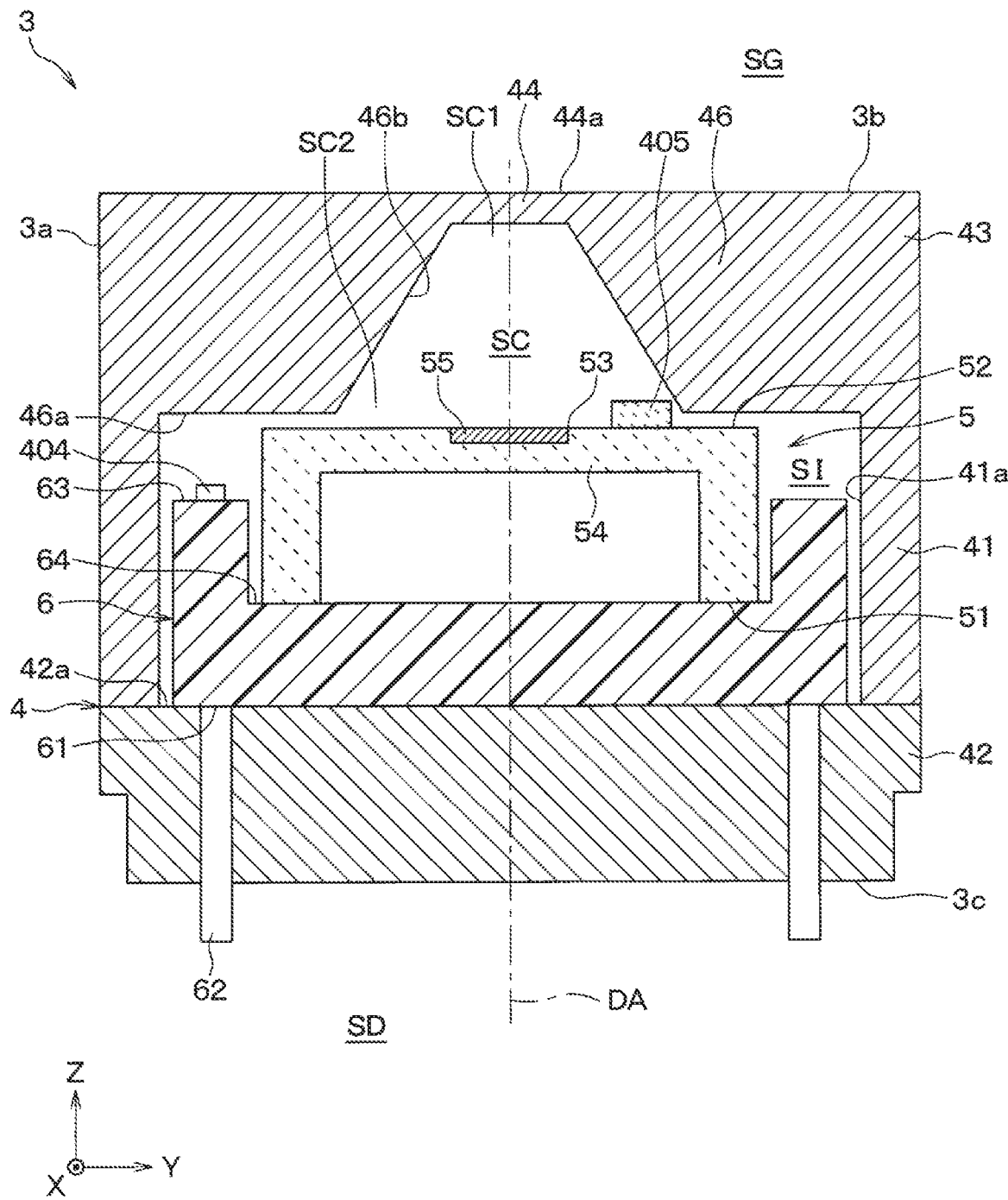
FIG. 10 is a schematic cross-sectional view illustrating an ultrasonic microphone according to a seventh embodiment.

Hereinafter, a seventh embodiment will be described with reference to FIG. 10. In the present embodiment, a frequency changing unit 405 is provided to change a vibration frequency of an ultrasonic element 53. Specifically, the frequency changing unit 405 is configured to change a structural resonance frequency of the ultrasonic element 53 based on an output of a temperature sensor 404.

Specifically, the frequency changing unit 405 is a MEMS type piezoelectric element, and is formed so as to generate distortion by voltage application. In other words, the frequency changing unit 405 is provided at an element diaphragm 54 in a semiconductor substrate 5, or at a position close to the element diaphragm 54 so as to adjust an internal stress, that is, a tension of the element diaphragm 54 by the distortion at the time of voltage application.

When the operating environment temperature of the ultrasonic sensor 1 changes, a resonance frequency of the case diaphragm 44 shifts. When the resonance frequency of the case diaphragm 44 shifts, a vibration propagation efficiency between the ultrasonic element 53 and the case diaphragm 44 decreases.

Therefore, in the present embodiment, the temperature sensor 404 and the frequency changing unit 405 are provided. In the configuration described above, the frequency changing unit 405 changes a resonance frequency of the ultrasonic element 53 in response to the detected operating environment temperature. Specifically, a control voltage is applied to the frequency changing unit 405 in response to the detected operating environment temperature. The frequency changing unit 405 adjusts the internal stress, that is, the tension, in the element diaphragm 54 by generating a strain in response to the applied control voltage.

According to the configuration described above, the deviation of a resonance condition due to a change in the operating environment temperature can be compensated well. In addition, the resonance frequency of the ultrasonic element 53 can be controlled independently of the resonant frequencies in the resonant space SC and the resonance frequency in the case diaphragm 44.

Eighth Embodiment

Hereinafter, an eighth embodiment will be described with reference to FIG. 11. In the present embodiment, multiple case diaphragms 44, multiple ultrasonic elements 53, and multiple resonant spaces SC are arrayed in the plane direction.

Figure 11:
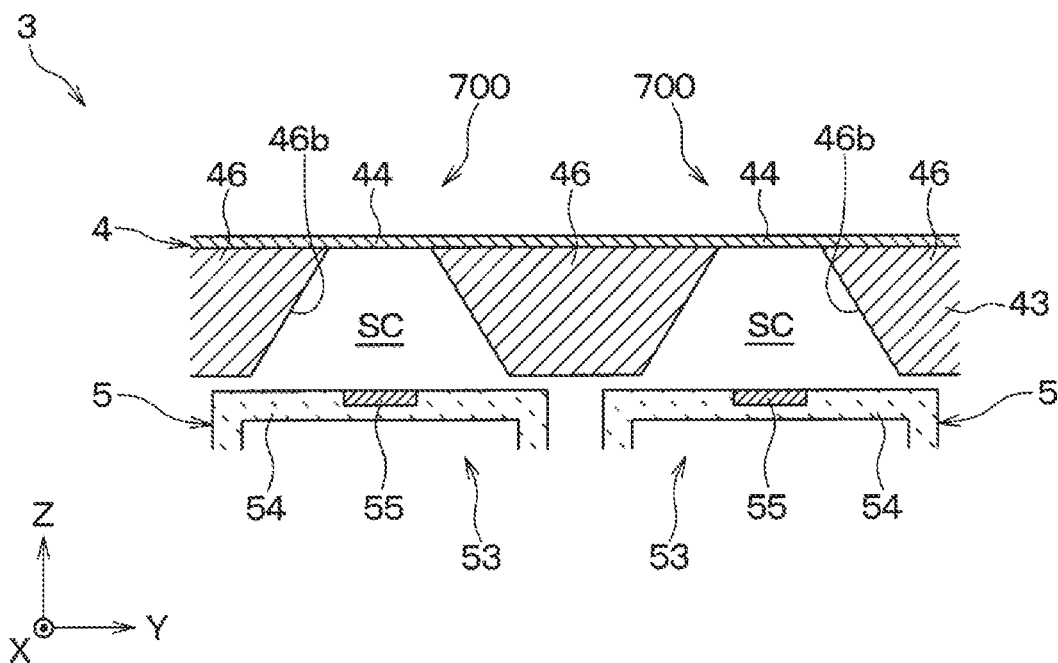
FIG. 11 is a schematic cross-sectional view illustrating an ultrasonic microphone according to an eighth embodiment.

In FIG. 11, two sets of the case diaphragm 44, the ultrasonic element 53, and the resonant space SC are aligned in a Y-axis direction, however, are not limited to the configuration described above. In other words, FIG. 11 may illustrate, for example, any two sets of case diaphragms 44, ultrasonic elements 53, and resonant spaces SC multiply aligned in the X-Y two-dimension direction. The same applies to FIG. 12 and the like.

For example as shown in FIG. 11, the outer bottom plate portion 43 has the multiple case diaphragms 44 aligned in the plane direction. In the element housing case 4, the multiple ultrasonic elements 53, the number of which is equal to that of the case diaphragms 44, are housed in a state of being aligned in the plane direction. One ultrasonic element 53 is provided on one semiconductor substrate 5.

The respective multiple ultrasonic elements 53 are disposed opposite to the case diaphragms 44 different from each other. In other words, the case diaphragm 44 and the ultrasonic element 53 correspond to each other in a one-to-one manner. One resonant space SC is provided between one case diaphragm 44 and one corresponding ultrasonic element 53.

According to the configuration described above, each of the multiple ultrasonic elements 53 can be satisfactorily protected while a function as a sensor array using those ultrasonic elements 53, for example, an angle detection function or the like can be satisfactorily realized. In addition, multiple pairs of the ultrasonic element 53, the resonant space SC, and the case diaphragm 44 are provided. At this time, the frequency characteristics in each set are individually designed, thereby being capable of realizing high performance such as widening of the band.

Ninth Embodiment

Figure 12:
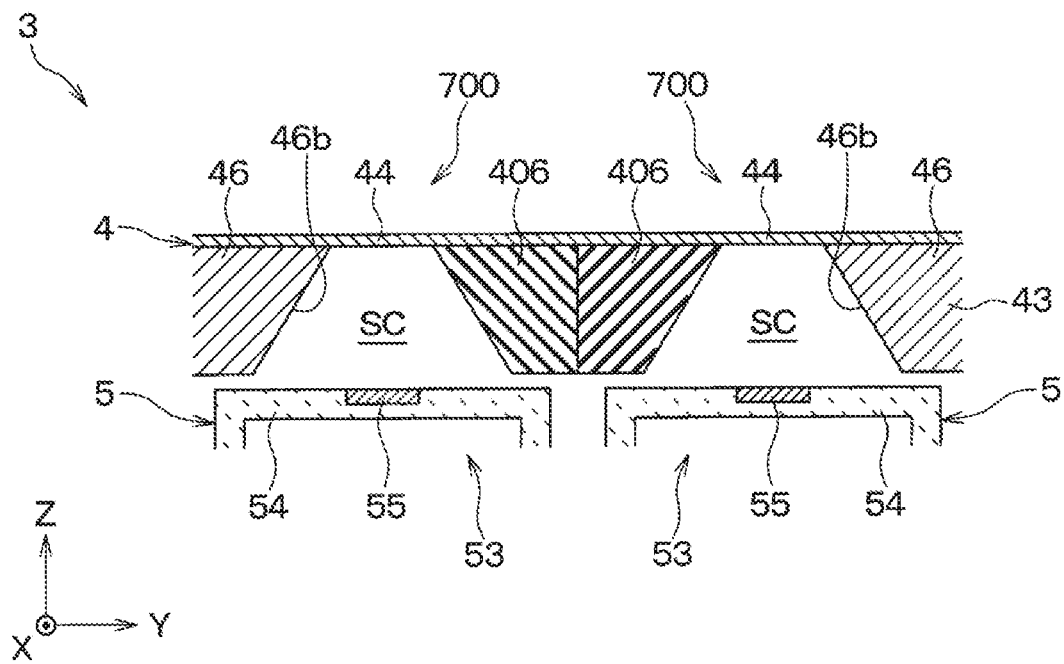
FIG. 12 is a schematic cross-sectional view illustrating an ultrasonic microphone according to a ninth embodiment.

Hereinafter, a ninth embodiment will be described with reference to FIG. 12. In the following description of the ninth embodiment, portions different from the eighth embodiment will be mainly described.

In the present embodiment, as in the eighth embodiment, multiple resonant spaces SC are aligned in the plane direction. As shown in FIG. 12, an ultrasonic microphone 3 further includes vibration isolation members 406. The vibration isolation members 406 are each interposed between the adjacent resonant spaces SC so as to inhibit vibration transmission between the adjacent resonant spaces SC.

Specifically, the vibration isolation members 406 are provided in portions corresponding to the case thick portions 46. The vibration isolation member 406 is made of a material having a damping function or a high vibration absorbing property, for example, an elastomer material such as silicone rubber. In that case, an outer bottom plate portion 43 can be formed, for example, by arraying the case thick portions 46 and the vibration isolation members 406 in the plane direction and bonding the case thick portions 46 and the vibration isolation members 406 to a thin plate made of metal for forming a case diaphragm 44.

According to the configuration described above, vibration transmission between the resonant spaces SC adjacent to each other in the plane direction can be satisfactorily inhibited. Therefore, when multiple sets of the ultrasonic element 53, the resonant space SC, and the case diaphragm 44 are provided, an interference between those sets can be satisfactorily inhibited.

Tenth Embodiment

Figure 13:
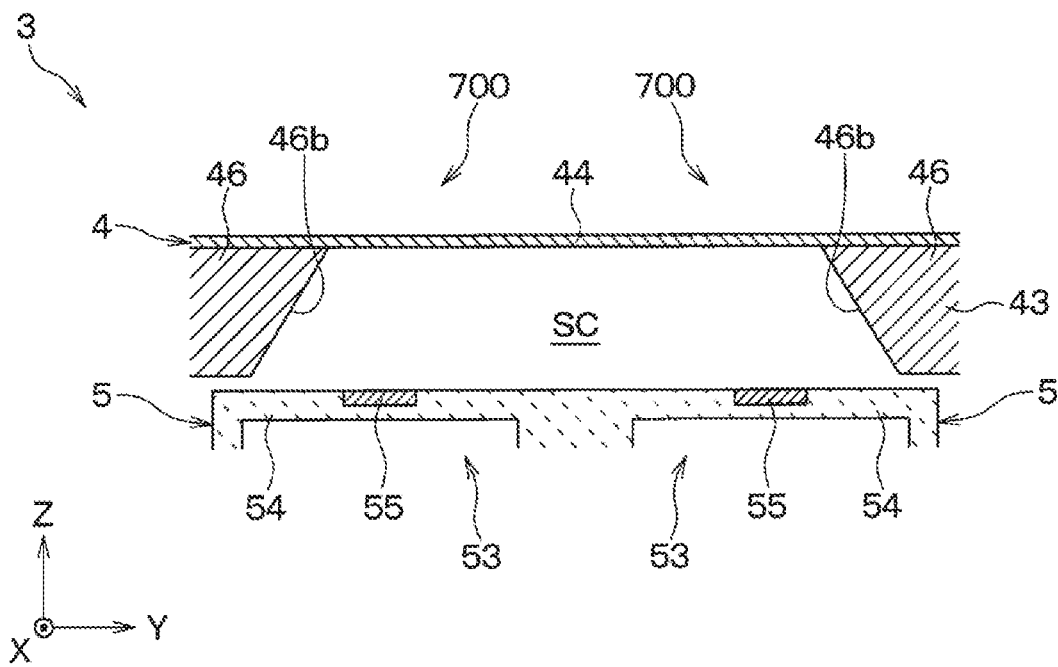
FIG. 13 is a schematic cross-sectional view illustrating an ultrasonic microphone according to a tenth embodiment.

Hereinafter, a tenth embodiment will be described with reference to FIG. 13. In the present embodiment, an ultrasonic microphone 3 is configured such that multiple ultrasonic elements 53 correspond to one case diaphragm 44 and one resonant space SC.

More specifically, a common case diaphragm 44 and resonant space SC are provided for multiple transmission and reception units 700. On the other hand, at least one ultrasonic element 53 is provided for each of the multiple transmission and reception units 700. In the example shown in FIG. 13, the multiple ultrasonic elements 53 are provided for one semiconductor substrate 5. In other words, one semiconductor substrate 5 having the multiple ultrasonic elements 53 is provided so as to correspond to one case diaphragm 44 and one resonant space SC.

According to the configuration described above, although the interference inhibition function is slightly inferior to that of the fourteenth embodiment, the same effects as those of the eighth embodiment can be achieved.

As described above, the multiple case diaphragms 44, the multiple ultrasonic elements 53, or multiple resonant spaces SC are aligned in the plane direction, so that the ultrasonic microphone 3 can be enhanced in function.

When the multiple case diaphragms 44 are arrayed in the plane direction, each of the multiple case diaphragms 44 may have a different resonance frequency. When the multiple ultrasonic elements 53 are aligned in the plane direction, each of the multiple ultrasonic elements 53 may have a different resonance frequency. When the multiple resonant spaces SC are arrayed in the plane direction, the multiple resonant spaces SC may have different resonant frequencies.

Eleventh Embodiment

Figure 14:
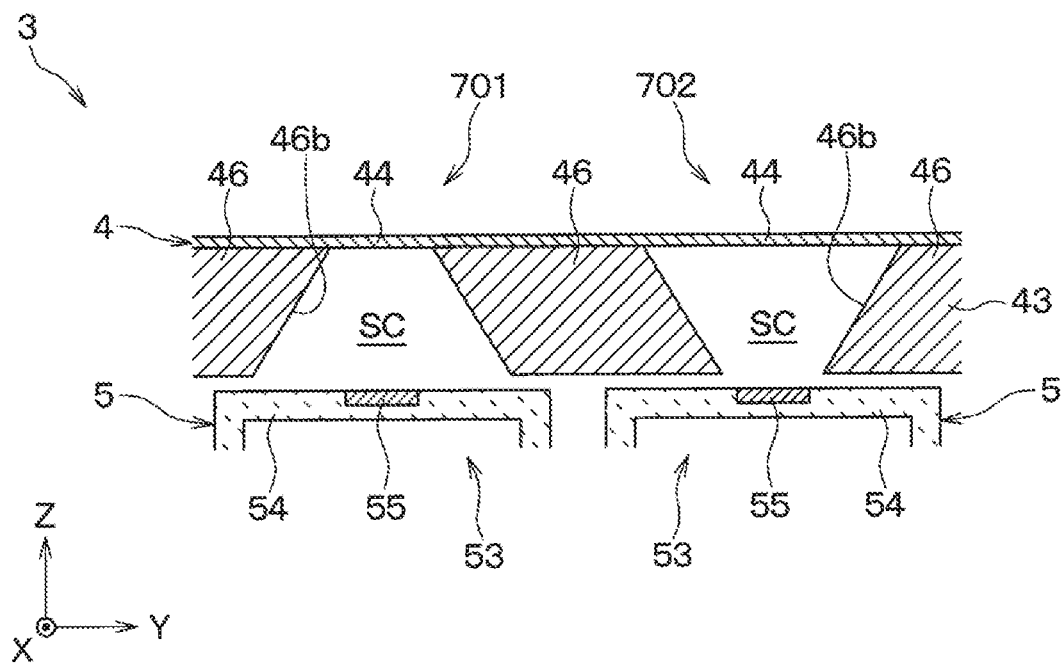
FIG. 14 is a schematic cross-sectional view illustrating an ultrasonic microphone according to an eleventh embodiment.

Hereinafter, an eleventh embodiment will be described with reference to FIG. 14. In the present embodiment, an ultrasonic microphone 3 includes a transmission unit 701 and a receiving unit 702.

The transmission unit 701 exclusively for transmission is provided so as to have only a function of transmitting a probe wave. The receiving unit 702 exclusively for reception is provided so as to have only a function of receiving a received wave. The transmission unit 701 and the receiving unit 702 are arrayed in the plane direction. Each of the transmission unit 701 and the receiving unit 702 has a case diaphragm 44, an ultrasonic element 53, and a resonant space SC.

The resonant space SC in the transmission unit 701 is formed so that a cross-sectional area of the resonant space SC is narrowed toward a transmission direction, that is, a positive direction of the Z-axis in the drawing, similarly to FIG. 3 and the like. This makes it possible to increase a sound pressure of a propagating wave at the time of transmission of a probe wave. In other words, the sound pressure of the probe wave is improved.

On the other hand, the resonant space SC in the receiving unit 702 is formed so that a cross-sectional area of the resonant space SC is narrowed toward a receiving direction, that is, a negative direction of the Z-axis in the drawing. This makes it possible to increase the sound pressure of the propagating wave at the time of reception of the received wave. In other words, the reception sensitivity is improved.

Modifications

The present disclosure is not limited to the embodiments described above. Therefore, the above embodiments can be appropriately changed. Hereinafter, typical modifications will be described. In the following description of the modifications, differences from the above embodiments will be mainly described. In the above embodiments and the modifications, the same reference numerals are assigned to the same or equivalent parts. Therefore, in the following description of the modifications, the description in the above embodiments can be appropriately incorporated for the components having the same reference numerals as those in the above embodiments, unless there is a technical contradiction or a special additional description.

The mounting target of the ultrasonic sensor 1 is not limited to the front bumper V3 and the rear bumper V4. Specifically, for example, the ultrasonic sensor 1 may also be mounted on the vehicle body panel V2. In other words, the mounting hole V5 may be provided also in the vehicle body panel V2. Further, the ultrasonic sensor 1 is not limited to a vehicle-mounted use. The ultrasonic sensor 1 is not limited to a clearance sonar. In other words, the ultrasonic sensor 1 can be used for other applications.

The ultrasonic sensor 1 is not limited to a configuration capable of transmitting and receiving an ultrasonic wave. In other words, for example, the ultrasonic sensor 1 may have a configuration capable of only transmitting the ultrasonic wave. Alternatively, the ultrasonic sensor 1 may have only a function of receiving a reflected wave of a probe wave, which is an ultrasonic wave transmitted from another ultrasonic transmitter, by an object existing in the periphery.

The configuration of each part of the ultrasonic sensor 1 is also not limited to the specific example described above. Specifically, for example, an external shape of the ultrasonic microphone 3, that is, the element housing case 4 is not limited to a substantially columnar shape, and may be a substantially regular hexagonal prism shape, a substantially regular octagonal prism shape, or the like. In other words, the element housing case 4 can be formed in a substantially columnar shape or a substantially frustum shape.

The material of the element housing case 4 is not limited to a metal material such as aluminum. In other words, for example, the element housing case 4 may be made of a synthetic resin material such as polycarbonate, polystyrene, or the like. Alternatively, the element housing case 4 may be made of carbon fiber, carbon fiber-containing resin, or the like. Alternatively, at least apart of the element housing case 4, for example, the case diaphragm 44, may be made of a material having a shape memory function or a superelastic function. As a result, a resonance frequency change caused by deformation due to a temperature change, an external force, or the like can be satisfactorily inhibited.

The structure of the element housing case 4 is not particularly limited as long as no technical inconvenience occurs. Specifically, for example, the side plate portion 41 and the outer bottom plate portion 43 may be integrally and seamlessly made of the same material as described above. Alternatively, the side plate portion 41 and the outer bottom plate portion 43 may be made of different materials.

The shape of the case diaphragm 44 in the plane direction is also not limited to a substantially circular shape as in the specific example described above. In other words, as the shape of the case diaphragm 44 in the plane direction, for example, an arbitrary shape such as a substantially rectangular shape, a substantially elliptical shape, a substantially regular hexagon shape, a substantially regular octagon shape, or the like can be adopted. Likewise, the shape of the resonant space SC is not limited to the truncated cone shape as in the specific example described above. In other words, the resonant space SC may be formed in a truncated quadrangular pyramid shape, a truncated hexagonal pyramid shape, an octagonal truncated pyramid shape, or the like, for example. In particular, in the configuration having the slit portion 45 shown in FIG. 3, the case diaphragm 44 and the resonant space SC may have shapes different from each other. Specifically, for example, even if the resonant space SC is formed in a truncated octagonal pyramid shape, the case diaphragm 44 may be formed in a circular shape.

The cross-sectional shape of the case diaphragm 44 is also not limited to a plate-like shape. Specifically, for example, the case diaphragm 44 may be formed in a curved plate shape protruding toward the vehicle body external space SG. Alternatively, for example, the case diaphragm 44 may be formed in a curved plate shape recessed toward the vehicle body external space SG.

The radial dimension of the slit portion 45 may be about the same as the radial dimension of the space bottom SC2. Alternatively, the radial dimension of the slit portion 45 may be greater than the radial dimension of the space top SC1 and less than the radial dimension of the space bottom SC2.

The case thick portion 46 may configure a part of the side plate portion 41 or a part of the outer bottom plate portion 43. Alternatively, the case thick portion 46 may be formed as a separate member from the side plate portion 41 and the outer bottom plate portion 43, and may be fixed to the side plate portion 41 or the outer bottom plate portion 43 by adhesion or the like.

In the first embodiment shown in FIG. 3, the spacer 47 may be omitted. In other words, nothing may be filled in the slit portion 45.

The slit portion 45 may also be provided in the configuration shown in FIG. 6 and subsequent drawings. In that case, the slit portion 45 is preferably filled with a spacer 47. However, the present disclosure is not limited to the configuration described above.

Figure 7:
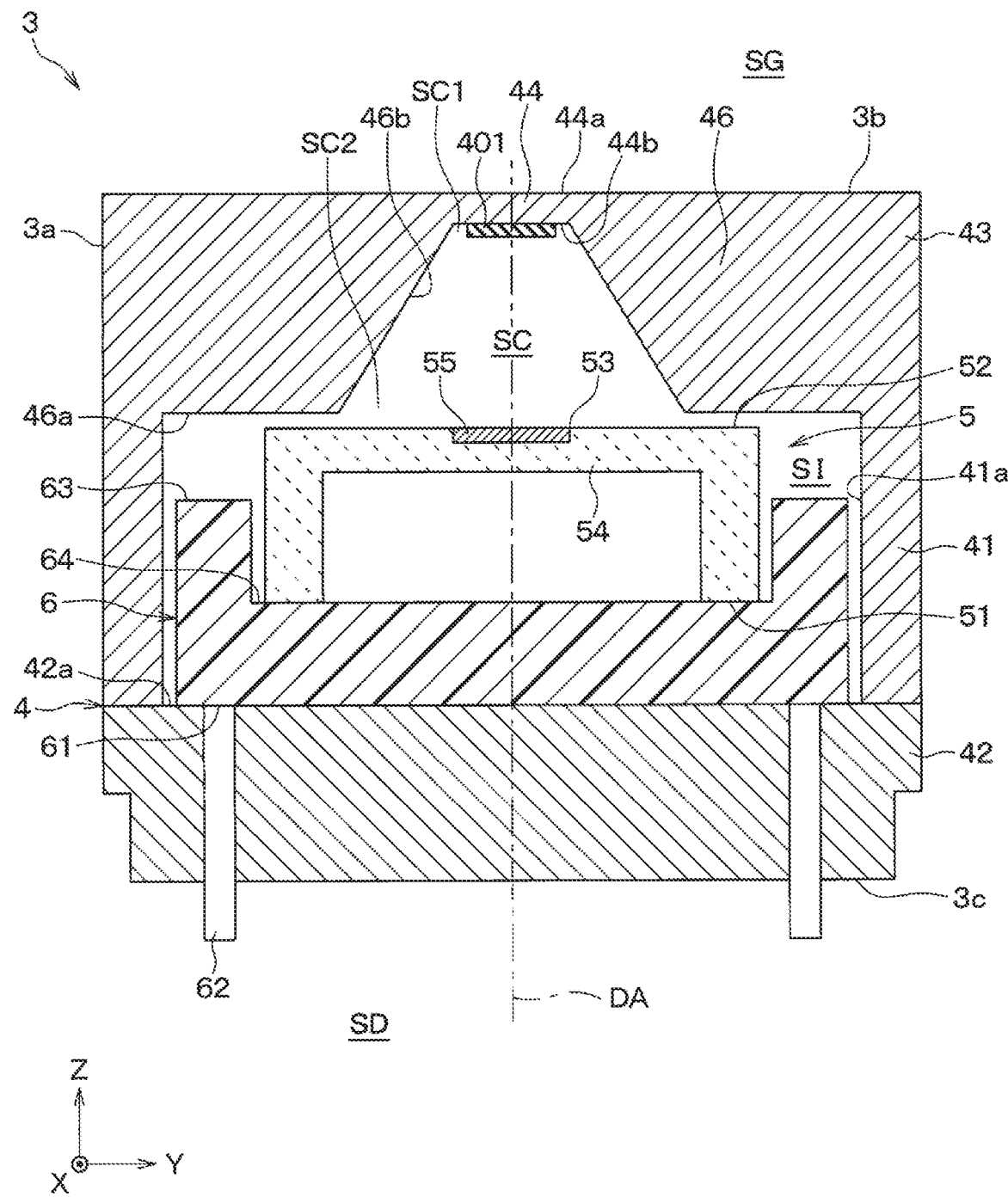
FIG. 7 is a schematic cross-sectional view illustrating an ultrasonic microphone according to a fourth embodiment.

The damping member 401 in the fourth embodiment shown in FIG. 7 is also applicable to other embodiments. However, when the slit portion 45 is filled with the spacer 47, the spacer 47 can perform the same function as the damping member 401 shown in FIG. 7. Therefore, the spacer 47 and the damping member 401 can be selectively applied. However, there is no problem even when the spacer 47 and the damping member 401 are used together.

Figure 8:
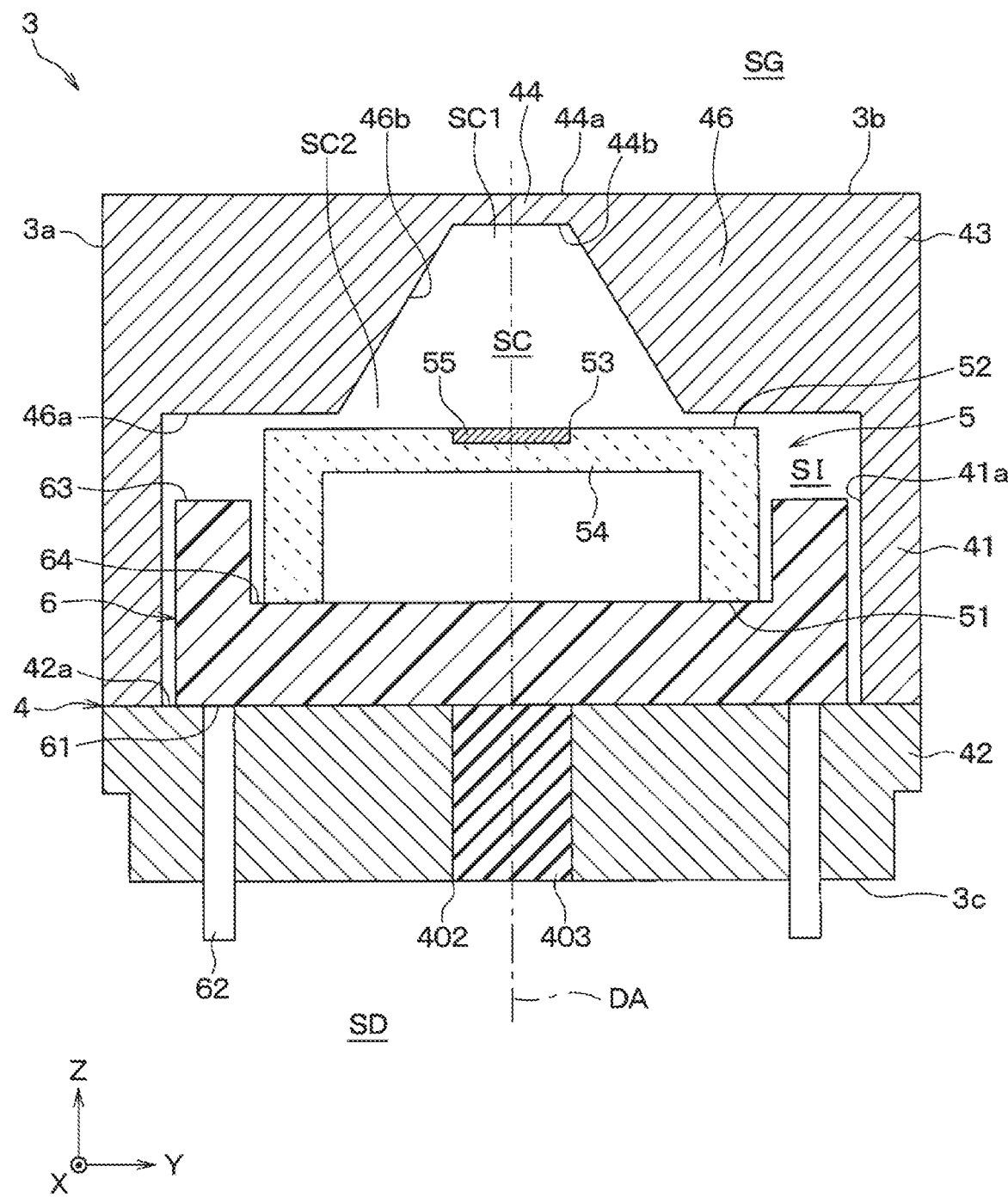
FIG. 8 is a schematic cross-sectional view illustrating an ultrasonic microphone according to a fifth embodiment.

The vent 402 and the vent sealing member 403 in the fifth embodiment shown in FIG. 8 are also applicable to other embodiments.

There is no particular limitation on the manner in which the temperature sensor 404 is installed. Specifically, for example, the temperature sensor 404 may be attached to the element housing case 4. Alternatively, the temperature sensor 404 may be a temperature detection element formed on the semiconductor substrate 5. Alternatively, an operating environment temperature of the ultrasonic sensor 1 is available from outside the ultrasonic sensor 1. In particular, the operating environment temperature may be detected by a separate temperature detection unit mounted on the vehicle V. Thus, the operating environment temperature may also be received from the ECU. For that reason, the temperature sensor 404 may be omitted.

The structure and the installation position of the frequency changing unit 405 are also not particularly limited. In other words, for example, the frequency changing unit 405 may be a heater.

The frequency changing unit 405 for changing the resonance frequency in the case diaphragm 44 and the frequency changing unit 405 for changing the resonant frequencies in the resonant space SC may coexist with each other. The frequency changing unit 405 for changing the resonant frequencies in the resonant space SC and the frequency changing unit 405 for changing the resonance frequency in the ultrasonic element 53 may coexist with each other. The frequency changing unit 405 for changing the resonance frequency in the case diaphragm 44 and the frequency changing unit 405 for changing the resonance frequency in the ultrasonic element 53 may coexist with each other. The frequency changing unit 405 for changing the resonance frequency in the case diaphragm 44, the frequency changing unit 405 for changing the resonant frequencies in the resonant space SC, and the frequency changing unit 405 for changing the resonance frequency in the ultrasonic element 53 can coexist with each other.

The configuration of the semiconductor substrate 5 including the type of the ultrasonic element 53 is also not particularly limited. In other words, for example, the ultrasonic elements 53 are not limited to a PMUT. Specifically, the ultrasonic elements 53 may have a configuration as a CMUT. The CMUT is an abbreviation for Capacitive Micromachined Ultrasound Transducer. Alternatively, for example, the ultrasonic element 53 may have a bulk type configuration.

The support substrate 6 may be fixed to the element housing case 4 by the side plate portion 41. Alternatively, the support substrate 6 may be fixed to the element housing case 4 by the case thick portion 46.

The support substrate 6 may be a circuit board. In other words, various circuit components for signal processing may be mounted on the mounting surface 63.

The support substrate 6 may not be a circuit board. In other words, various circuit components for signal processing may be mounted on the semiconductor substrate 5. Alternatively, the circuit component may be mounted on a control circuit board (not shown) provided inside the case main body 2a.

The support substrate 6 may be integrated with the semiconductor substrate 5. In other words, the support substrate 6 may be omitted.

The configurations shown in FIGS. 3 and 6 to 10 may be applied to the array-type configurations shown in FIGS. 11 to 14.

As is obvious from the description of the fifth embodiment shown in FIG. 8, the resonant space SC is not limited to a space hermetically and liquid-tightly sealed. In other words, if the propagation performance of the ultrasonic vibration between the ultrasonic element 53 and the case diaphragm 44 is satisfactorily obtained, a strict airtightness in the resonant space SC is not required. However, when a liquid such as water enters the resonant space SC, the volume of the resonant space SC decreases with the result of which the resonant frequencies fluctuates. In addition, deterioration may occur due to a liquid such as water that has penetrated. For that reason, it is preferable that the resonant space SC is formed at least as a liquid-tightly sealed space.

In the respective embodiments above, plural elements integrally formed as seamless may be formed by bonding separate bodies, and plural elements formed by bonding separate bodies may be formed integrally as seamless.

In the respective embodiments above, plural elements made of the same material may be formed by materials different from each other, and plural elements made of materials different from each other may be made of the same material.

In the respective embodiments above, it goes without saying that elements forming the embodiments are not necessarily essential unless specified as being essential or deemed as being apparently essential in principle. In a case where a reference is made to the components of the respective embodiments as to numerical values, such as the number, values, amounts, and ranges, the components are not limited to the numerical values unless specified as being essential or deemed as being apparently essential in principle. Also, in a case where a reference is made to the components of the respective embodiments above as to shapes and positional relations, the components are not limited to the shapes and the positional relations unless explicitly specified or limited to particular shapes and positional relations in principle.

The modifications are not limited to the above. It should be appreciated that the embodiments above are not irrelevant to one another and can be combined appropriately unless a combination is obviously impossible, and that the modification are not irrelevant to one another and can be combined appropriately unless a combination is obviously impossible.

What is claimed is:

1. An ultrasonic sensor comprising:
   an ultrasonic element arranged to transmit or receive a propagating wave, which is an ultrasonic wave propagating along a directional axis; and
   an element housing case that includes a case diaphragm, which is a vibration membrane or a vibrating plate having a thickness direction along the directional axis, the element housing case housing the ultrasonic element while separating the ultrasonic element from the case diaphragm, wherein
   a resonant space for the propagating wave is defined between the case diaphragm and the ultrasonic element,
   a horn shape is defined in the element housing case in which a width of the resonant space in a plane direction orthogonal to the directional axis is reduced as the resonant space extends in an axial direction parallel to the directional axis, and
   the ultrasonic element, the resonant space, and the case diaphragm are configured such that a first resonance frequency, which is a resonance frequency in the ultrasonic element, a second resonance frequency, which is a resonance frequency in the resonant space, and a third resonance frequency, which is a resonance frequency in the case diaphragm, coincide with each other.

2. The ultrasonic sensor according to claim 1, wherein
   when a maximum value among a difference between the first resonance frequency and the second resonance frequency, a difference between the second resonance frequency and the third resonance frequency, and a difference between the first resonance frequency and the third resonance frequency is defined as $\Delta fr$, and a bandwidth of a widest resonance band among resonance bands of the ultrasonic element, the resonant space, and the case diaphragm is defined as BW, a relationship of $\Delta fr \leq BW$ is satisfied.

3. The ultrasonic sensor according to claim 1, further comprising a damping member housed in the resonant space.

4. The ultrasonic sensor according to claim 1, wherein
   the element housing case has a vent provided to communicate an internal space with an external space, and
   the vent is liquid-tightly sealed to allow a passage of an air while inhibiting a passage of a liquid.

5. The ultrasonic sensor according to claim 4, wherein
   the element housing case includes
      a side plate portion formed in a cylindrical shape surrounding the directional axis,
      an inner bottom plate portion that closes one end side of the side plate portion in the axial direction, and
      an outer bottom plate portion that liquid-tightly closes the other end side of the side plate portion in the axial direction,
   the case diaphragm is formed as a thin portion provided in the outer bottom plate portion, and
   the vent is provided in the inner bottom plate portion.

6. The ultrasonic sensor according to claim 1, further comprising a frequency changing unit provided to change a vibration frequency in the ultrasonic element, the resonant space, or the case diaphragm in response to an operating environment temperature of the ultrasonic sensor.

7. The ultrasonic sensor according to claim 1, wherein a plurality of the case diaphragms, a plurality of the ultrasonic elements, or a plurality of the resonant spaces are arrayed in the plane direction.

8. The ultrasonic sensor according to claim 7, further comprising a vibration isolation member interposed between the adjacent resonant spaces to inhibit a vibration transmission between the adjacent resonant spaces when the plurality of resonant spaces are arrayed in the plane direction.

9. An ultrasonic sensor comprising:
   an ultrasonic element arranged to transmit or receive a propagating wave, which is an ultrasonic wave propagating along a directional axis; and
   an element housing case that includes a case diaphragm, which is a vibration membrane or a vibrating plate having a thickness direction along the directional axis, the element housing case housing the ultrasonic element while separating the ultrasonic element from the case diaphragm, wherein
   a resonant space for the propagating wave is defined between the case diaphragm and the ultrasonic element,
   a horn shape is defined in the element housing case in which a width of the resonant space in a plane direction orthogonal to the directional axis is reduced as the resonant space extends in an axial direction parallel to the directional axis,
   the element housing case includes a case thick portion which is a thick portion formed around an outer side of the case diaphragm in a radial direction orthogonal to the directional axis to surround the resonant space,
   the case thick portion includes a horn inner surface which faces the resonant space to define the resonant space,
   the resonant space has
      a space bottom, which is an end of the resonant space adjacent to the ultrasonic element in the axial direction, and
      a space top, which is an end of the resonant space adjacent to the case diaphragm in the axial direction,
   the horn inner surface is formed in a cone inner surface shape which tapers the resonant space toward the case diaphragm, and
   a radial dimension of the space bottom is larger than a radial dimension of the space top.

10. The ultrasonic sensor according to claim 9, wherein
    the ultrasonic element has an element diaphragm, which is a vibration membrane or a vibration plate formed on a semiconductor substrate and having a thickness direction along the directional axis, and
    the element diaphragm has a radial dimension coinciding with the radial dimension of the space bottom.

11. The ultrasonic sensor according to claim 9, wherein the ultrasonic element is fixedly supported on the element housing case to cause a gap between the ultrasonic element and the case thick portion in the axial direction to be ¼ or less of a wavelength of the propagating wave.

12. The ultrasonic sensor according to claim 9, wherein
    the case thick portion has a slit extending from the space top in the radial direction to communicate with the space top,
    the case diaphragm has a central portion facing the space top in the axial direction, and a ring-shaped portion facing the slit in the axial direction, and the slit has a radial dimension larger than the radial dimension of the space bottom.

13. The ultrasonic sensor according to claim 12, wherein an axial dimension of the slit is set to ¼ or less of a wavelength of the propagating wave.

14. The ultrasonic sensor according to claim 12, further comprising a spacer which is an elastic body filled in the slit.

15. The ultrasonic sensor according to claim 14, wherein the spacer has an elastic modulus lower than that of the case diaphragm.

16. The ultrasonic sensor according to claim 9, wherein the horn inner surface is formed in a curved shape.

17. An ultrasonic sensor comprising:
an ultrasonic element arranged to transmit or receive a propagating wave, which is an ultrasonic wave propagating along a directional axis; and
an element housing case that includes a case diaphragm, which is a vibration membrane or a vibrating plate having a thickness direction along the directional axis, the element housing case housing the ultrasonic element while separating the ultrasonic element from the case diaphragm, wherein
a resonant space for the propagating wave is defined between the case diaphragm and the ultrasonic element,
a horn shape is defined in the element housing case in which a width of the resonant space in a plane direction orthogonal to the directional axis is reduced as the resonant space extends in an axial direction parallel to the directional axis, and
an axial dimension of the resonant space is set to $K \cdot (\lambda/2 + N\lambda)$, where $\lambda$ is the wavelength of the propagating wave, N is an integer greater than or equal to 0, and K is in a range from 0.9 to 1.1.

18. An ultrasonic sensor comprising:
an ultrasonic element arranged to transmit or receive a propagating wave, which is an ultrasonic wave propagating along a directional axis; and
an element housing case that includes a case diaphragm, which is a vibration membrane or a vibrating plate having a thickness direction along the directional axis, the element housing case housing the ultrasonic element while separating the ultrasonic element from the case diaphragm, wherein
a resonant space for the propagating wave is defined between the case diaphragm and the ultrasonic element, and
a horn shape is defined in the element housing case in which a width of the resonant space in a plane direction orthogonal to the directional axis is reduced as the resonant space extends in an axial direction parallel to the directional axis, and
when $\beta$ is in a range from 0.9 to 1.1, a ratio of a width of a top surface of the resonant space in the plane direction to a width of a bottom surface of the resonant space in the plane direction is set to $0.5 \cdot \beta$.

19. The ultrasonic sensor according to claim 1, wherein the ultrasonic element, the resonant space, and the case diaphragm are configured to have a resonance frequency in a range between 30 kHz and 100 kHz.

20. The ultrasonic sensor according to claim 1, wherein
the case diaphragm has a transmission and reception surface which is an outer surface intersecting with the directional axis,
when the ultrasonic sensor is mounted on a vehicle body of a vehicle, the transmission and reception surface is exposed to a space outside the vehicle body from a through hole provided in an outer plate of the vehicle body, and
the case diaphragm is formed to have a thickness of 0.5 mm or more.

* * * * *